(12) United States Patent
Ogawa

(10) Patent No.: US 11,490,007 B2
(45) Date of Patent: Nov. 1, 2022

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Shigeo Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 17/033,391

(22) Filed: Sep. 25, 2020

(65) Prior Publication Data

US 2021/0099642 A1  Apr. 1, 2021

(30) Foreign Application Priority Data

Sep. 30, 2019 (JP) .............................. JP2019-180365

(51) Int. Cl.
*H04N 5/232* (2006.01)
*G06N 3/08* (2006.01)

(52) U.S. Cl.
CPC .......... *H04N 5/23222* (2013.01); *G06N 3/08* (2013.01); *H04N 5/23245* (2013.01)

(58) Field of Classification Search
CPC .......... H04N 5/23222; H04N 5/23245; H04N 21/251; G06N 3/08
See application file for complete search history.

(56) References Cited

U.S. PATENT DOCUMENTS

2014/0049662 A1* 2/2014 Lin .................... H04N 5/23222
348/222.1

FOREIGN PATENT DOCUMENTS

JP   2001051338 A   2/2001
JP   2016536868 A   11/2016

* cited by examiner

*Primary Examiner* — Ahmed A Berhan
(74) *Attorney, Agent, or Firm* — Canon U.S.A., Inc. IP Division

(57) ABSTRACT

An image capturing apparatus includes an image pickup device configured to output image data, and at least one processor programmed to perform the operations of following units: a calculation unit configured to calculate an evaluation value used to determine whether to perform an image capturing operation for recording the image data; a setting unit configured to set a threshold value used to determine whether to perform an image capturing operation for recording the image data; a determination unit configured to make a determination as to whether to control execution of an image capturing operation using the evaluation value and the threshold value; and a storing unit configured to store image capturing history information obtained from execution of an image capturing operation based on the determination made by the determination unit, wherein the setting unit sets the threshold value based on the image capturing history information.

15 Claims, 16 Drawing Sheets

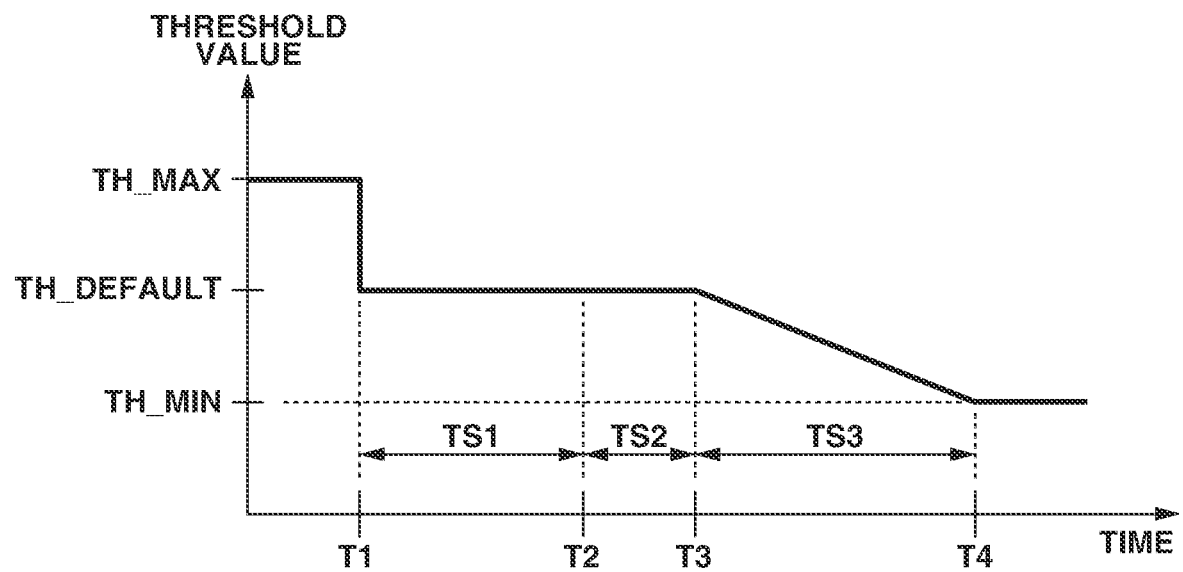
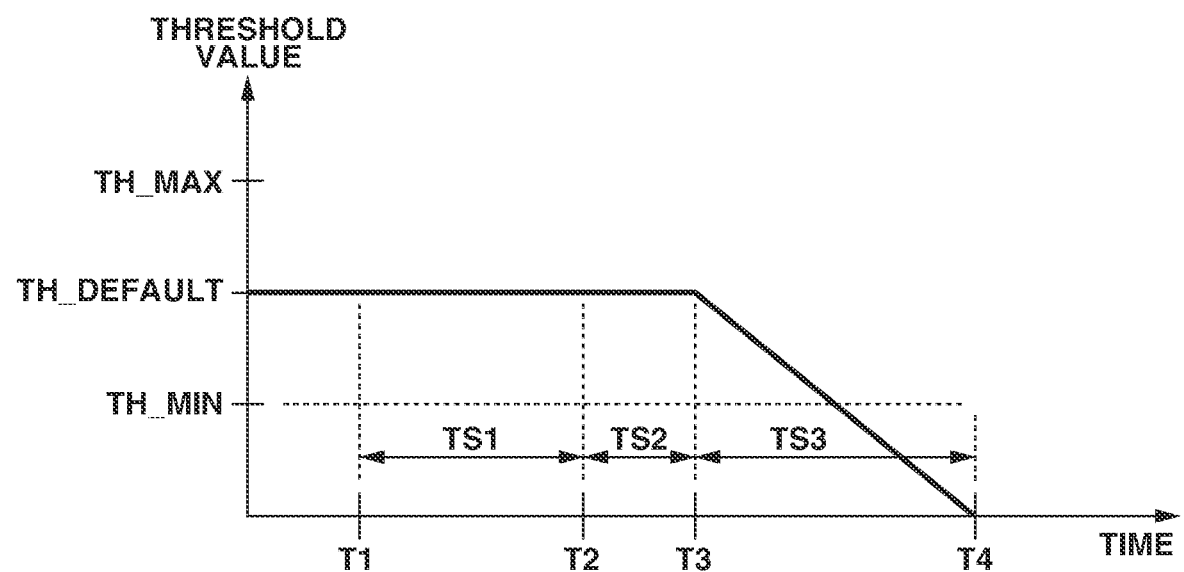

IMAGE CAPTURING APPARATUS, CONTROL METHOD THEREFOR, AND STORAGE MEDIUM

BACKGROUND OF THE INVENTION

Field of the Invention

Aspects of the present disclosure generally relate to an automatic image capturing technique in image capturing apparatuses.

Description of the Related Art

In image capturing of a still image or a moving image using an image capturing apparatus such as a camera, usually, the user thereof determines an image capturing target through, for example, a viewfinder, adjusts framing of an image to be captured while confirming an image capturing condition with an operation of the operator, and then performs image capturing. Such an image capturing apparatus is conventionally provided with a contrivance which performs detection of a user's operation mistake or an external environment, notifies the user if there is a situation unsuitable for image capturing, and controls the camera to come into a state suitable for image capturing.

In contrast to such an image capturing apparatus which performs image capturing in response to a user's operation, there is known a life logging camera which periodically and continuously performs image capturing without the user issuing an image capturing instruction, as discussed in Japanese Unexamined Patent Application Publication (Translation of PCT Application) No. 2016-536868. The life logging camera, which is used while being worn on the body of the user, records a scene which the user sees in everyday life at intervals of a predetermined time as a video image. Since image capturing using the life logging camera is performed not at timing intended by the user such as timing of pressing of a shutter button by the user but at intervals of a predetermined time, a sudden moment which would not be usually captured can be left as a video image.

Moreover, heretofore, there has been known an image capturing apparatus which automatically performs image capturing of a target. This image capturing apparatus automatically performs image capturing in a case where it is determined that a predetermined condition has been satisfied, as discussed in Japanese Patent Application Laid-Open No. 2001-51338.

However, in a case where the life logging camera worn on the user periodically performs automatic image capturing, the following issues may occur. One issue is that, since image capturing is performed at intervals of a predetermined time without reference to the intention of the user, a video image at the moment which the user wants to really capture may fail to be captured. Moreover, the other issue is that, if, to avoid a failure to perform image capturing, the image capturing interval is shortened, the power consumption by image capturing may become large and, thus, the image capturing available time may become shorter.

On the other hand, in the image capturing apparatus which performs automatic image capturing in a case where a predetermined condition has been satisfied, the following issues may occur. One issue occurs in a case where the frequency of automatic image capturing is high. Even when image capturing is intended to be evenly performed within a determined time, image capturing would be performed if a predetermined condition has been satisfied. Therefore, there may occur a case where, while the image capturing frequency becomes very high in the first half of the time range, the battery charge remaining amount or card capacity remaining amount becomes insufficient in the second half of the time range, thus disabling image capturing. Moreover, the other issue occurs in a case where the frequency of automatic image capturing is low. Even in a case where, for example, a business operator intends to perform image capturing for a predetermined number of images, it may be hard for a predetermined condition for automatic image capturing to be satisfied and, thus, the number of captured images may become short.

SUMMARY OF THE INVENTION

Aspects of the present disclosure are generally directed to preventing or reducing a failure to perform image capturing of a video image by controlling the image capturing frequency in an image capturing apparatus which performs automatic image capturing.

According to an aspect of the present disclosure, an image capturing apparatus includes an image pickup device configured to output image data, and at least one processor programmed to perform the operations of following units: a calculation unit configured to calculate an evaluation value used to determine whether to perform an image capturing operation for recording the image data; a setting unit configured to set a threshold value used to determine whether to perform an image capturing operation for recording the image data; a determination unit configured to make a determination as to whether to control execution of an image capturing operation using the evaluation value and the threshold value; and a storing unit configured to store image capturing history information obtained from execution of an image capturing operation based on the determination made by the determination unit, wherein the setting unit sets the threshold value based on the image capturing history information.

Further features of the present disclosure will become apparent from the following description of exemplary embodiments with reference to the attached drawings.

BRIEF DESCRIPTION OF THE DRAWINGS

FIG. 10D is a diagram used to explain control of the image capturing frequency.

FIG. 10E is a diagram used to explain control of the image capturing frequency.

DESCRIPTION OF THE EMBODIMENTS

Various exemplary embodiments, features, and aspects of the invention will be described in detail below with reference to the drawings.

<Configuration of Camera>

Figure 1A:
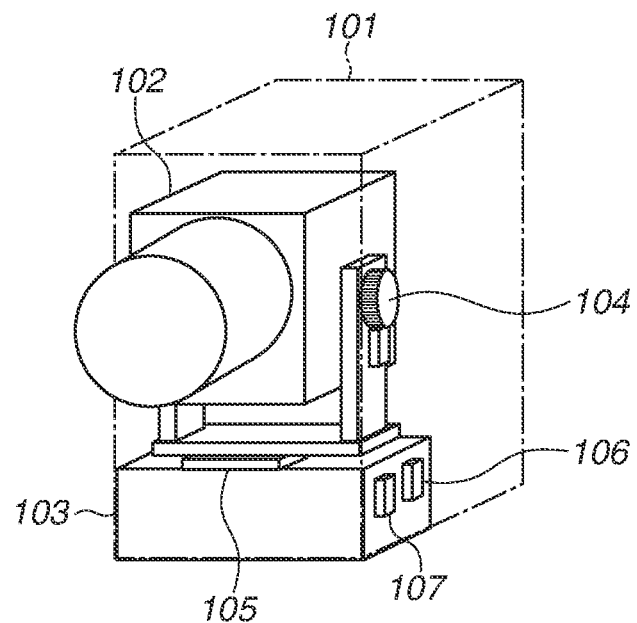
FIGS. 1A and 1B are diagrams schematically illustrating an outer appearance of a camera serving as an exemplary embodiment of an image capturing apparatus.
Figure 1B:
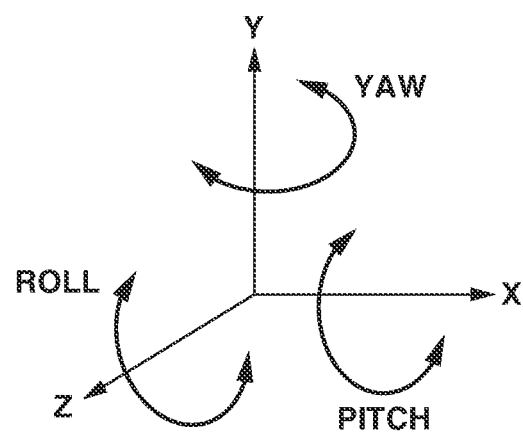

FIGS. 1A and 1B are diagrams schematically illustrating an outer appearance of a camera serving as an exemplary embodiment of an image capturing apparatus. A camera 101 illustrated in FIG. 1A is provided with, for example, a power switch and operation members operable to perform a camera operation. A lens barrel 102, which integrally includes image capturing lens groups serving as an image capturing optical system and an image sensor used to perform image capturing of a subject image, is movably mounted to a stationary portion 103 of the camera 101. Specifically, the lens barrel 102 is mounted to the stationary portion 103 via a tilt rotation unit 104 and a pan rotation unit 105, which are mechanisms capable of rotationally driving the lens barrel 102 with respect to the stationary portion 103.

The tilt rotation unit 104 includes a motor driving mechanism capable of rotationally driving the lens barrel 102 in pitch directions illustrated in FIG. 1B, and the pan rotation unit 105 includes a motor driving mechanism capable of rotationally driving the lens barrel 102 in yaw directions illustrated in FIG. 1B. Thus, the camera 101 includes a mechanism which rotationally drives the lens barrel 102 in two-axis directions. The respective axes illustrated in FIG. 1B are defined with respect to the position of the stationary portion 103. An angular velocity meter 106 and an acceleration meter 107 are mounted on the stationary portion 103 of the camera 101. Then, detecting the vibration of the camera 101 based on output signals of the angular velocity meter 106 and the acceleration meter 107 to rotationally drive the tilt rotation unit 104 and the pan rotation unit 105 enables correcting shaking of the lens barrel 102 or correcting inclination of the lens barrel 102. Moreover, the angular velocity meter 106 and the acceleration meter 107 are used to perform movement detection of the camera 101 based on measuring results obtained for a predetermined period of time.

Figure 2:
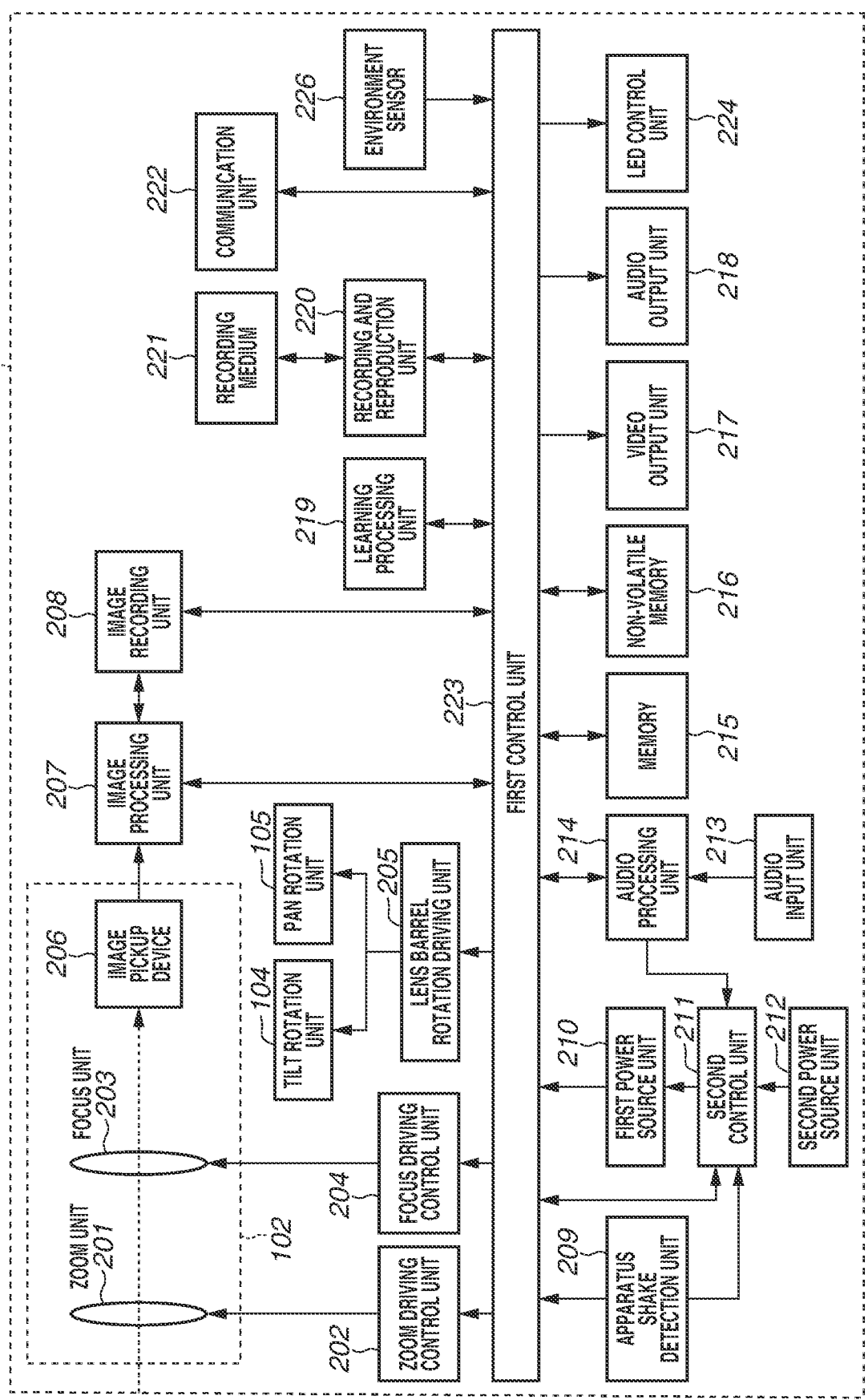
FIG. 2 is a block diagram illustrating an overall configuration of the camera according to an exemplary embodiment.

FIG. 2 is a block diagram illustrating an overall configuration of the camera 101 in the present exemplary embodiment. Referring to FIG. 2, a first control unit 223 includes, for example, a central processing unit (CPU) (or a micro processing unit (MPU)) and memories (dynamic random access memory (DRAM) and static random access memory (SRAM)). Then, the first control unit 223 performs various processing operations according to a program stored in a non-volatile memory (electrically erasable programmable read-only memory (EEPROM)) 216 to control respective blocks of the camera 101 and control data transfer between respective blocks. The non-volatile memory 216, which is an electrically erasable and recordable memory, stores, for example, constants and programs for use in operations of the first control unit 223 as mentioned above.

Referring to FIG. 2, a zoom unit 201 includes a zoom lens used to perform variation of magnification (enlargement or reduction of a formed subject image). A zoom driving control unit 202 drives and controls the zoom unit 201 and also detects a focal length obtained at that time. A focus unit 203 includes a focus lens used to perform focus adjustment (focusing). A focus driving control unit 204 drives and controls the focus unit 203. An image pickup device 206, which includes an image sensor, receives light entering through the respective lens groups, and outputs information about electric charges corresponding to the amount of received light as an analog image signal to an image processing unit 207. Furthermore, the zoom unit 201, the focus unit 203, and the image pickup device 206 are arranged in the lens barrel 102.

The image processing unit 207 applies image processing, such as distortion correction, white balance adjustment, and color interpolation processing, to digital image data obtained by performing analog-to-digital (A/D) conversion of the analog image signal, and outputs digital image data with the image processing applied thereto. The digital image data output from the image processing unit 207 is converted into a recording format such as the Joint Photographic Experts Group (JPEG) format by an image recording unit 208, and is then stored in a memory 215 or transmitted to a video output unit 217 described below.

A lens barrel rotation driving unit 205 drives the tilt rotation unit 104 and the pan rotation unit 105 to drive the lens barrel 102 in tilt directions and pan directions. An apparatus shake detection unit 209 includes the angular velocity meter (gyroscope sensor) 106, which detects angular velocities in three-axis directions of the camera 101, and the acceleration meter (acceleration sensor) 107, which detects accelerations in three-axis directions of the camera 101. Then, the apparatus shake detection unit 209 calculates the rotational angle of the camera 101 and the amount of shift of the camera 101 based on signals detected by these sensors.

An audio input unit 213 acquires an audio signal obtained around the camera 101 by a microphone provided in the camera 101, converts the acquired audio signal into a digital audio signal, and transmits the digital audio signal to an audio processing unit 214. The audio processing unit 214 performs processing related to sounds, such as optimization processing, with respect to the input digital audio signal. Then, the audio signal processed by the audio processing unit 214 is transmitted to the memory 215 by the first control unit 223. The memory 215 temporarily stores an image signal and an audio signal obtained from the image processing unit 207 and the audio processing unit 214.

The image processing unit 207 and the audio processing unit 214 read out an image signal and an audio signal temporarily stored in the memory 215, and perform coding of the image signal and coding of the audio signal to generate a compressed image signal and a compressed audio signal, respectively. The first control unit 223 transmits the generated compressed image signal and compressed audio signal to a recording and reproduction unit 220.

The recording and reproduction unit 220 records, on a recording medium 221, for example, a compressed image signal and a compressed audio signal generated by the image processing unit 207 and the audio processing unit 214 and control data concerning image capturing. Moreover, in the case of not performing compression coding on an audio signal, the first control unit 223 transmits an audio signal generated by the audio processing unit 214 and a compressed image signal generated by the image processing unit 207 to the recording and reproduction unit 220, thus causing the recording and reproduction unit 220 to record the audio signal and the compressed image signal on the recording medium 221.

The recording medium 221 can be a recording medium incorporated in the camera 101 or a recording medium detachable from the camera 101 and is able to record various types of data, such as a compressed image signal, a compressed audio signal, and an audio signal, generated by the camera 101. Usually, a medium larger in capacity than the non-volatile memory 216 is used as the recording medium 221. For example, the recording medium 221 includes various types of recording media, such as a hard disk, an optical disc, a magneto-optical disc, a compact disc recordable (CD-R), a digital versatile disc recordable (DVD-R), a magnetic tape, a non-volatile semiconductor memory, and a flash memory.

The recording and reproduction unit 220 reads out (reproduces) a compressed image signal, a compressed audio signal, an audio signal, various pieces of data, and a program recorded on the recording medium 221. Then, the first control unit 223 transmits the read-out compressed image signal and compressed audio signal to the image processing unit 207 and the audio processing unit 214, respectively. The image processing unit 207 and the audio processing unit 214 temporarily store the compressed image signal and compressed audio signal in the memory 215, decode the compressed image signal and compressed audio signal according to predetermined procedures, and then transmit the decoded image signal and audio signal to the video output unit 217.

The audio input unit 213 is provided with a plurality of microphones, and the audio processing unit 214 is able to detect the direction of a sound with respect to a plane on which the plurality of microphones is placed, so that the detected direction of a sound is used for the search for a subject or used for automatic image capturing described below. Additionally, the audio processing unit 214 detects a specific voice command. The voice command can be configured to include, in addition to several commands registered in advance, specific voices which the user is allowed to register with the camera 101. Moreover, the audio processing unit 214 also performs sound scene recognition. The sound scene recognition includes determining a sound scene using a network which has previously been caused to learn by machine learning based on a large volume of audio data. For example, a network for detecting specific scenes, such as "a cheer is arising", "clapping is being performed", and "a sound is being uttered", is set in the audio processing unit 214, so that the audio processing unit 214 detects a specific sound scene or a specific voice command. Upon detecting a specific sound scene or a specific voice command, the audio processing unit 214 outputs a detection trigger signal to the first control unit 223 and a second control unit 211.

In addition to the first control unit 223, which controls the entire main system of the camera 101, the camera 101 further includes the second control unit 211, which controls electric power to be supplied to the first control unit 223. A first power source unit 210 and a second power source unit 212 respectively supply electric power used to cause the first control unit 223 and the second control unit 211 to operate. While pressing of a power button provided on the camera 101 causes electric power to both the first control unit 223 and the second control unit 211, the first control unit 223 also controls the first power source unit 210 to turn off supplying of electric power to the first control unit 223 itself. Even during a period in which the first control unit 223 is not operating, the second control unit 211 is operating, so that information from the apparatus shake detection unit 209 or the audio processing unit 214 is input to the second control unit 211. The second control unit 211 determines whether to activate the first control unit 223 based on various pieces of input information, and, upon determining to perform activation, the second control unit 211 instructs the first power source unit 210 to supply electric power to the first control unit 223.

An audio output unit 218 outputs, for example, a previously set sound pattern from a loudspeaker incorporated in the camera 101 at the time of for example, image capturing. A light-emitting diode (LED) control unit 224 causes, for example, an LED provided on the camera 101 to light up based on a previously set lighting pattern or blinking pattern at the time of, for example, image capturing. The video output unit 217, which includes, for example, a video output terminal, outputs an image signal to cause, for example, a connected external display to display a video image. Moreover, the audio output unit 218 and the video output unit 217 can be a single integrated terminal, such as a High-Definition Multimedia Interface (HDMI®) terminal.

A communication unit 222 is a portion which performs communication between the camera 101 and an external apparatus, and transmits and receives pieces of data, such as an audio signal, an image signal, a compressed audio signal, and a compressed image signal. Moreover, the communication unit 222 receives control signals concerning image capturing, such as commands for image capturing start and end, panning and tilting, and zoom driving, and drives the camera 101 based on an instruction from the external apparatus. Moreover, the communication unit 222 transmits and receives pieces of information such as various parameters concerning learning which is processed by a learning processing unit 219 described below, between the camera 101 and the external apparatus. The communication unit 222 includes, for example, a wireless communication module such as an infrared communication module, a Bluetooth® communication module, a wireless local area network (LAN) communication module, Wireless USB®, or a Global Positioning System (GPS) receiver.

An environment sensor 226 detects the state of an environment surrounding the camera 101 with a predetermined period. The environment sensor 226 includes a temperature sensor which detects the temperature around the camera 101, an atmospheric pressure sensor which detects a change in atmospheric pressure around the camera 101, and an illuminance sensor which detects the brightness around the camera 101. Additionally, the environment sensor 226 further includes, for example, a humidity sensor which detects the humidity around the camera 101 and an ultraviolet (UV) sensor which detects the amount of ultraviolet light around the camera 101. The detected temperature information, atmospheric pressure information, brightness information, humidity information, and UV information and, in addition thereto, for example, a temperature change amount, atmospheric pressure change amount, brightness change amount, humidity change amount, and ultraviolet change amount obtained by calculating change rates at intervals of a predetermined time from the various detected pieces of information are used for determination to perform, for example, automatic image capturing described below.

<Communication with External Apparatus>

Figure 3:
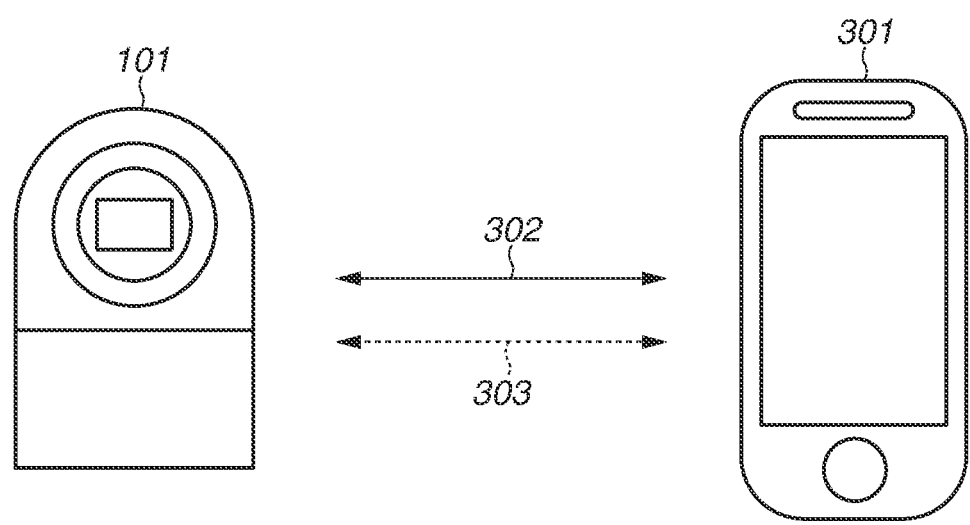
FIG. 3 is a diagram illustrating a configuration example of a wireless communication system between the camera and an external apparatus.

FIG. 3 is a diagram illustrating a configuration example of a wireless communication system between the camera 101 and an external apparatus 301. The camera 101 is a digital camera having an image capturing function, and the external apparatus 301 is a smart device including a Bluetooth communication module and a wireless LAN communication module.

The camera 101 and the external apparatus 301 are able to perform communication with each other via a first communication 302 using a wireless LAN compliant with, for example, the IEEE 802.11 standard series. Moreover, the camera 101 and the external apparatus 301 are also able to perform communication with each other via a second communication 303 having a master-slave relationship including, for example, a control station and a tributary station, such as Bluetooth Low Energy (hereinafter referred to as "BLE"). Furthermore, each of the wireless LAN and BLE is an example of a communication method, and, as long as each communication apparatus has two or more communication functions and, for example, one communication function which performs communication in a relationship between a control station and a tributary station is able to be used to control the other communication function, another communication method can be employed. However, the first communication 302, which is, for example, a wireless LAN, is assumed to be able to perform higher speed communication than the second communication 303, which is, for example, BLE, and, moreover, the second communication 303 is assumed to be at least one of being lower in power consumption or being shorter in communication feasible distance than the first communication 302.

Figure 4:
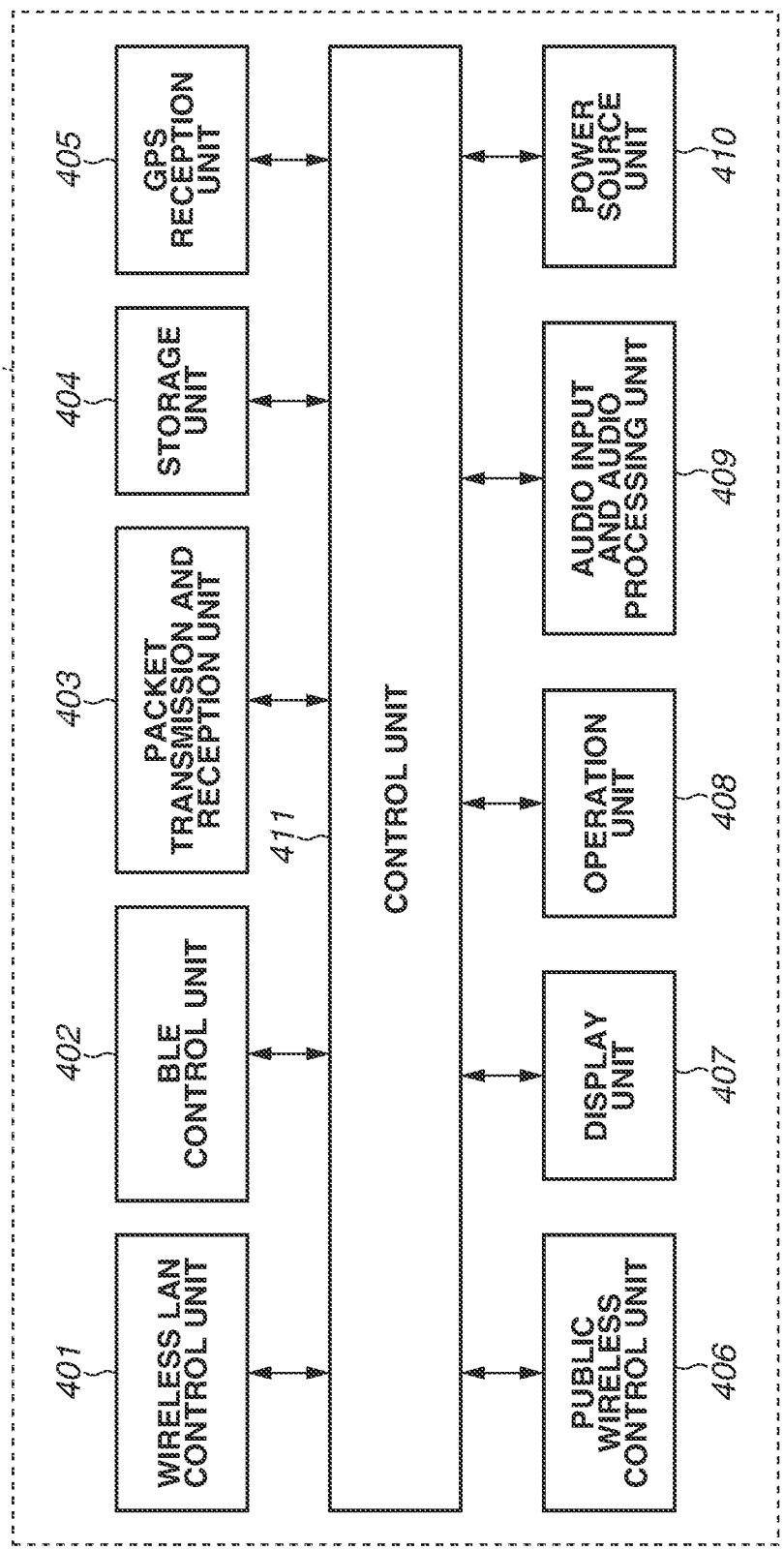
FIG. 4 is a diagram illustrating a configuration of the external apparatus.

A configuration of the external apparatus 301 is described with reference to FIG. 4. The external apparatus 301 includes, for example, a wireless LAN control unit 401 for wireless LAN and a BLE control unit 402 for BLE and, in addition thereto, a public wireless control unit 406 for public wireless communication. Moreover, the external apparatus 301 further includes a packet transmission and reception unit 403. The wireless LAN control unit 401 performs radio frequency (RF) control for wireless LAN, communication processing, driver processing for performing various control operations for communication using a wireless LAN compliant with the IEEE 802.11 standard series, and protocol processing concerning communication using a wireless LAN. The BLE control unit 402 performs RF control for BLE, communication processing, driver processing for performing various control operations for communication using BLE, and protocol processing concerning communication using BLE. The public wireless control unit 406 performs RF control for public wireless communication, communication processing, driver processing for performing various control operations for public wireless communication, and protocol processing concerning public wireless communication. The public wireless communication is a communication compliant with, for example, the International Multimedia Telecommunications (IMT) standard or the Long-Term Evolution (LTE) standard. The packet transmission and reception unit 403 performs processing for performing at least one of transmission and reception of a packet concerning communications using wireless LAN and BLE and public wireless communication. Furthermore, while, in the description of the present exemplary embodiment, the external apparatus 301 is assumed to perform at least one of transmission and reception of a packet in communication, instead of a packet exchange, another communication method such as a line switching can be employed.

The external apparatus 301 further includes, for example, a control unit 411, a storage unit 404, a GPS reception unit 405, a display unit 407, an operation unit 408, an audio input and audio processing unit 409, and a power source unit 410. The control unit 411 controls the entire external apparatus 301 by, for example, executing a control program stored in the storage unit 404. The storage unit 404 stores, for example, the control program, which the control unit 411 executes, and various pieces of information such as parameters required for communication. Various operations described below are implemented by the control unit 411 executing the control program stored in the storage unit 404.

The power source unit 410 supplies electric power to the external apparatus 301. The display unit 407 having a function capable of outputting visually recognizable information using, for example, a liquid crystal display (LCD) or an LED or outputting a sound using, for example, a loudspeaker, and displays various pieces of information. The operation unit 408 includes, for example, buttons via which an operation performed on the external apparatus 301 by the user is received. Furthermore, the display unit 407 and the operation unit 408 can be configured with a common member such as a touch panel.

The audio input and audio processing unit 409 can be configured to acquire a voice uttered by the user with, for example, a general-purpose microphone incorporated in the external apparatus 301 and discriminate an operation instruction from the user by performing voice recognition processing. Moreover, the audio input and audio processing unit 409 can acquire a voice command obtained by utterance of the user using a dedicated application incorporated in the external apparatus 301 and register the acquired voice command as a specific voice command which the audio processing unit 214 of the camera 101 is caused to recognize via the first communication 302 using wireless LAN.

The GPS reception unit 405 receives a Global Positioning System (GPS) signal communicated from satellites, analyzes the GPS signal, and estimates the current location (longitude and latitude information) of the external apparatus 301. Alternatively, the current location of the external apparatus 301 can be estimated based on information about wireless networks located nearby with use of, for example, a Wi-Fi positioning system (WPS). In a case where the acquired current GPS location information is present in a location range previously set in advance (within a range with a predetermined radius centering on the detection position) or in a case where GPS location information indicates a change of location the amount of which is greater than or equal to a predetermined amount, the GPS reception unit 405 notifies the camera 101 of movement information via the BLE control unit 402. Then, the current location information or the movement information is used as parameters for automatic image capturing or automatic editing described below.

As mentioned above, the camera 101 and the external apparatus 301 performs exchange of data via communications using the wireless LAN control unit 401 and the BLE control unit 402. For example, the camera 101 and the external apparatus 301 transmit and receive various pieces of data, such as an audio signal, an image signal, a compressed audio signal, and a compressed image signal. Moreover, the external apparatus 301 transmits, to the camera 101, for example, an image capturing instruction, voice command registration data, a predetermined notification of location detection that is based on GPS location information, and a notification of location movement. Moreover, the camera 101 and the external apparatus 301 perform transmission and reception of learning data using a dedicated application incorporated in the external apparatus 301.

<Configuration of Accessory Type>

Figure 5:
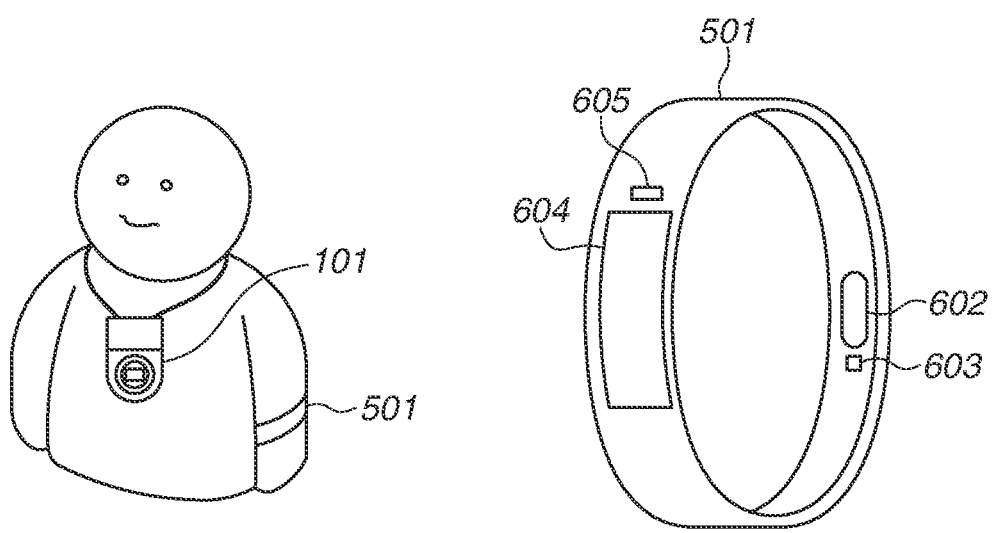
FIG. 5 is a diagram illustrating configurations of the camera and an external apparatus.

FIG. 5 is a diagram illustrating a configuration example of an external apparatus 501, which is able to communicate with the camera 101. The camera 101 is a digital camera having an image capturing function, and the external apparatus 501 is, for example, a wearable device including various sensing units which are able to communicate with the camera 101 via, for example, a Bluetooth communication module.

The external apparatus 501 is configured to be able to be worn on, for example, the arm of the user, and is equipped with, for example, sensors for detecting biological information, such as a pulse, heart rate, and blood flow, about the user and an acceleration sensor capable of detecting a motional state of the user.

A biological information detection unit 602 includes, for example, a pulse sensor for detecting a pulse, a heart rate sensor for detecting heart rate, a blood flow sensor for detecting blood flow, and a sensor for detecting a change in electric potential based on the contact with the skin using a conductive polymer. In the present exemplary embodiment, the biological information detection unit 602 is described as a heart rate sensor. The heart rate sensor detects the heart rate of the user by, for example, irradiating the skin with infrared light with use of, for example, an LED, detecting infrared light passing through the tissue of the body with a light receiving sensor, and performing signal processing on the received infrared light. The biological information detection unit 602 outputs the detected biological information as a signal to a control unit 607 (illustrated in FIG. 6).

A shake detection unit 603, which detects a motional state of the user, includes, for example, an acceleration sensor or a gyroscope sensor and is able to detect a motion indicating whether the user is moving or whether the user is performing an action while swinging the arm, based on information about acceleration. Moreover, the external apparatus 501 is further equipped with an operation unit 605, which receives an operation performed on the external apparatus 501 by the user, and a display unit 604, such as a monitor which outputs visually recognizable information using, for example, an LCD or an LED.

Figure 6:
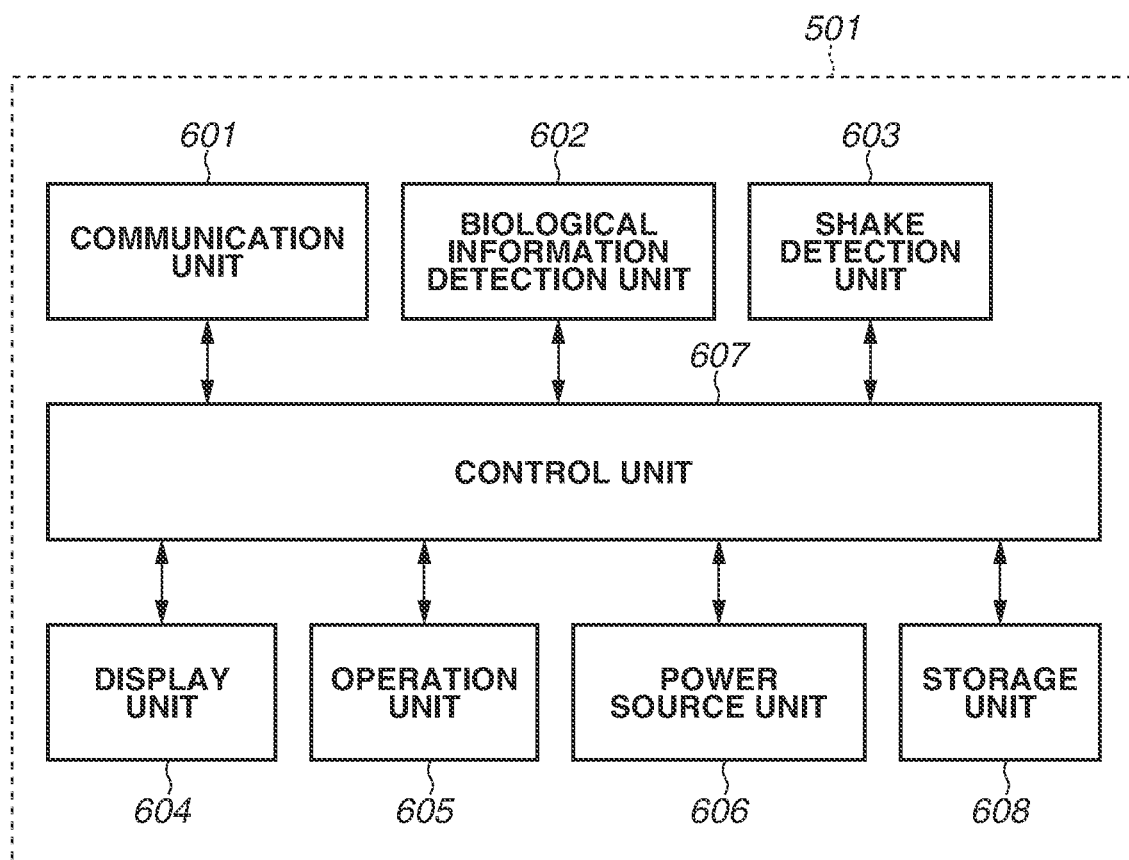
FIG. 6 is a block diagram illustrating a configuration of the external apparatus.

FIG. 6 is a diagram illustrating a configuration of the external apparatus 501. As mentioned above, the external apparatus 501 includes, for example, the control unit 607, a communication unit 601, the biological information detection unit 602, the shake detection unit 603, the display unit 604, the operation unit 605, a power source unit 606, the control unit 607, and a storage unit 608.

The control unit 607 controls the entire external apparatus 501 by, for example, executing a control program stored in the storage unit 608. The storage unit 608 stores, for example, the control program, which the control unit 607 executes, and various pieces of information such as parameters required for communication. Various operations described below are implemented by the control unit 607 executing the control program stored in, for example, the storage unit 608.

The power source unit 606 supplies electric power to the external apparatus 501. The display unit 604 includes, for example, an output unit for visually recognizable information, such as an LCD or an LED, or an output unit capable of outputting a sound, such as a loudspeaker, and displays various pieces of information. The operation unit 605 includes, for example, buttons via which an operation performed on the external apparatus 501 by the user is received.

Furthermore, the display unit 604 and the operation unit 605 can be configured with a common member such as a touch panel. Moreover, the operation unit 605 can be configured to acquire a voice uttered by the user with, for example, a general-purpose microphone incorporated in the external apparatus 501 and discriminate an operation instruction from the user by performing voice recognition processing.

The communication unit 601 transmits various pieces of detection information acquired by the biological information detection unit 602 and the shake detection unit 603 and then processed by the control unit 607 from the external apparatus 501 to the camera 101. For example, the communication unit 601 is able to transmit detection information to the camera 101 at the timing of detection of a change in heart rate of the user or transmit detection information to the camera 101 at the timing of a change in movement state, such as a walking movement, a traveling movement, or coming to a stand. Moreover, the communication unit 601 is able to transmit detection information at the timing of detection of a previously set motion of arm swing or transmit detection information at the timing of detection of a movement by a previously set distance.

<Operation Sequence of Camera>

Figure 7:
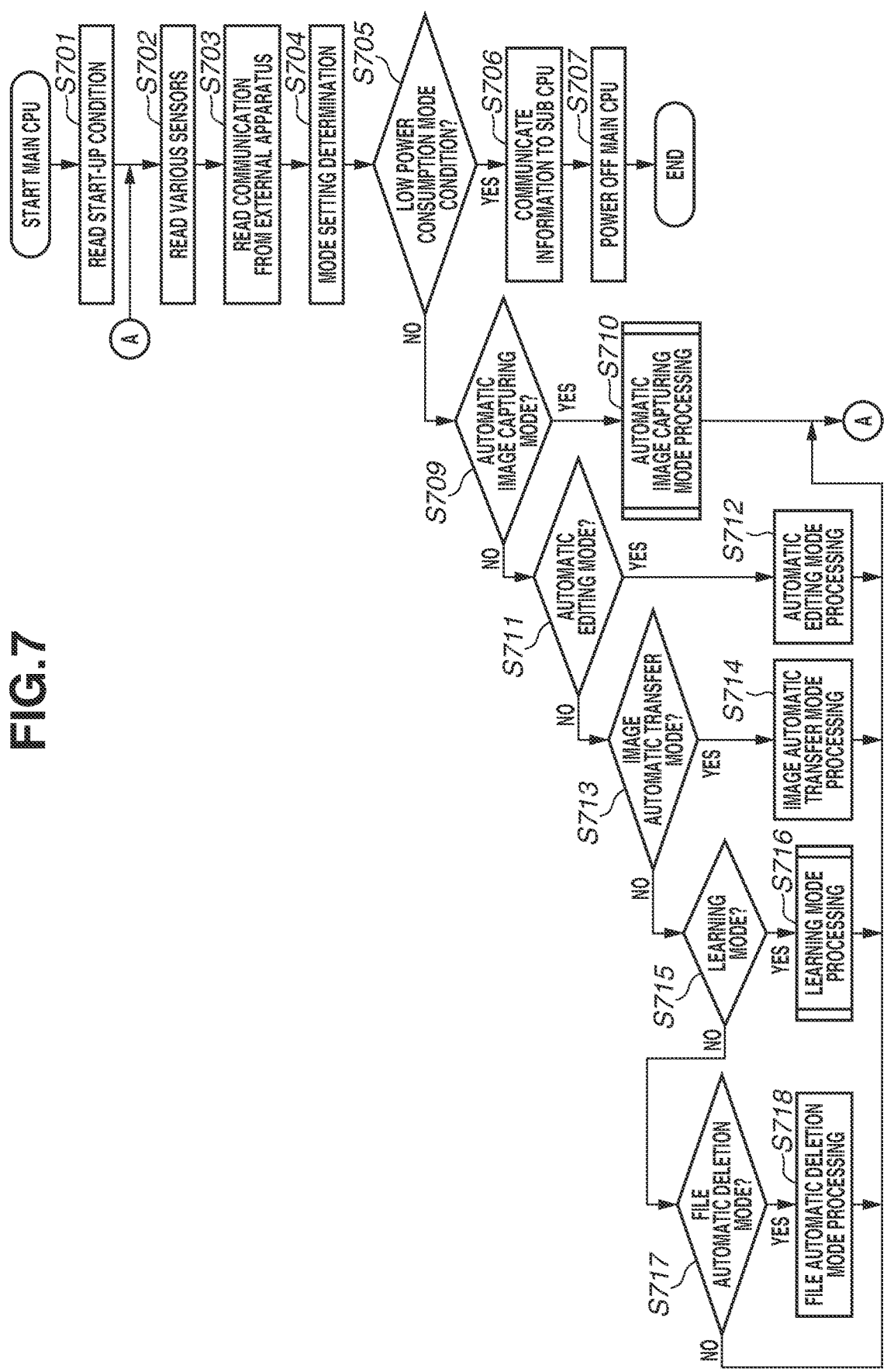
FIG. 7 is a flowchart illustrating an operation of a first control unit.

FIG. 7 is a flowchart illustrating an example of an operation which the first control unit 223 of the camera 101 handles in the present exemplary embodiment.

When the user operates a power button provided on the camera 101, electric power is supplied from the first power source unit 210 to the first control unit 223 and various blocks of the camera 101. Moreover, similarly, electric power is supplied from the second power source unit 212 to the second control unit 211. Details of an operation of the second control unit 211 are described below with reference to the flowchart of FIG. 8.

When electric power is supplied, the processing illustrated in FIG. 7 starts. In step S701, the first control unit 223 performs reading of a start-up condition for power. In the present exemplary embodiment, the condition for starting up the power includes the following three cases:

(1) a case where the power is started up by the power button being manually pressed;

(2) a case where the power is started up in response to a start-up instruction transmitted from an external apparatus (for example, the external apparatus 301) via external communication (for example, BLE communication); and (3) a case where the power is started up in response to an instruction from the second control unit 211.

Here, while, in the case (3), where the power is started up in response to an instruction from the second control unit 211, a start-up condition calculated in the second control unit 211 is read, details thereof are described below with reference to FIG. 8. Moreover, while the start-up condition read in this step is used as one parameter element used at the time of subject search or automatic image capturing, details thereof are also described below. Upon completion of reading of the start-up condition, the first control unit 223 advances the processing to step S702.

In step S702, the first control unit 223 performs reading of detection signals output from various sensors. The sensor signals read in this step include a signal output from a sensor for detecting a vibration, such as the gyroscope sensor or acceleration sensor included in the apparatus shake detection unit 209. Moreover, the sensor signals include signals indicating rotation positions of the tilt rotation unit 104 and the pan rotation unit 105. Additionally, the sensor signals include, for example, an audio signal detected by the audio processing unit 214, a detection trigger signal for specific voice recognition, a sound direction detection signal, and a detection signal for environmental information detected by the environment sensor 226. Upon completion of reading of detection signals output from various sensors in step S702, the first control unit 223 advances the processing to step S703.

In step S703, the first control unit 223 detects whether a communication instruction transmitted from an external apparatus has been received and, if the communication instruction has been received, performs communication with the external apparatus. For example, the first control unit 223 performs transmission and reception of, for example, a remote operation, an audio signal, an image signal, a compressed audio signal, and a compressed image signal via wireless LAN or BLE with the external apparatus 301. Moreover, the first control unit 223 performs reading of, for example, an operation instruction for, for example, image capturing, transmission of voice command registration data, a predetermined location detection notification that is based on GPS location information, a place movement notification, and transmission and reception of learning data with the external apparatus 301. Moreover, in a case where there is updating of motional information about the user, action information about the arm, or biological information about, for example, heart rate transmitted from the external apparatus 501, the first control unit 223 performs reading of information via BLE. Furthermore, the above-mentioned environment sensor 226 may be mounted in the camera 101, but can be mounted in the external apparatus 301 or the external apparatus 501. In that case, in step S703, the first control unit 223 also performs reading of environmental information via BLE. Upon completion of communication reading from the external apparatus in step S703, the first control unit 223 advances the processing to step S704.

In step S704, the first control unit 223 performs mode setting determination, and then advances the processing to step S705. In step S705, the first control unit 223 determines whether the operation mode is currently set to a low-consumption mode in step S704. In a case where the operation mode is none of "automatic image capturing mode", "automatic editing mode", "image automatic transfer mode", "learning mode", and "file automatic deletion mode" each described below, the first control unit 223 determines that the operation mode is set to the low-consumption mode. If, in step S705, it is determined that the operation mode is set to the low-consumption mode (YES in step S705), the first control unit 223 advances the processing to step S706.

In step S706, the first control unit 223 notifies the second control unit 211 (sub CPU) of various parameters related to a start-up factor which is determined in the second control unit 211 (a shake detection determination parameter, a sound detection parameter, and a time elapse detection parameter). Such various parameters change in value by being learned by learning processing described below. Upon completion of processing in step S706, the first control unit 223 advances the processing to step S707, in which the first control unit 223 (main CPU) turns off the power thereof and then ends the processing.

If, in step S705, it is determined that the operation mode is not the low-consumption mode (NO in step S705), then in step S709, the first control unit 223 determines whether the mode setting in step S704 is the automatic image capturing mode. Here, processing for the mode setting determination in step S704 is described. Modes to be determined are selected from among the following modes.

(1) Automatic Image Capturing Mode
<Mode Determination Condition>
If it is determined that automatic image capturing should be performed, based on respective pieces of detection information on which learning setting has been performed (image, sound, time, vibration, location, change in body, and change in environment) and information about, for example, a time elapsed from transition to the automatic image capturing mode, past image capturing information, and the number of captured images, the operation mode is set to the automatic image capturing mode.
<Intra-Mode Processing>
In automatic image capturing mode processing (step S710), the first control unit 223 performs driving for pan, tilt, and zoom to automatically search for a subject based on respective pieces of detection information (image, sound, time, vibration, location, change in body, and change in environment). Then, if it is determined that timing at which user's favorite image capturing is able to be performed has been reached, the first control unit 223 automatically performs image capturing.

(2) Automatic Editing Mode
<Mode Determination Condition>
If it is determined that automatic editing should be performed, based on a time elapsed from the previous automatic editing having been performed and past captured image information, the operation mode is set to the automatic editing mode.
<Intra-Mode Processing>
In automatic editing mode processing (step S712), the first control unit 223 performs selection processing for still images or moving images that is based on learning, and performs automatic editing processing for generating a highlight moving image obtained by putting images together into one moving image according to an image effect or a time of the edited moving image based on learning.

(3) Image Automatic Transfer Mode
<Mode Determination Condition>
In a case where the image automatic transfer mode is set by an instruction issued with use of a dedicated application incorporated in the external apparatus 301, if it is determined that image automatic transfer should be performed, based on a time elapsed from the previous image transfer having been performed and past captured image information, the operation mode is set to the image automatic transfer mode.
<Intra-Mode Processing>
In image automatic transfer mode processing (step S714), the camera 101 automatically extracts an image which would match the preference of the user, and automatically transfers the image which would match the preference of the user to the external apparatus 301. Extraction of an image which would match the preference of the user is performed based on a score obtained by determining a preference of the user appended to each image described below.

(4) Learning Mode
<Mode Determination Condition>
If it is determined that automatic learning should be performed, based on, for example, a time elapsed from the previous learning processing having been performed, information integrated with images usable for learning, and the number of pieces of learning data, the operation mode is set to the learning mode. Additionally, in a case where an instruction for setting the learning mode is received via communication from the external apparatus 301, the operation mode is also set to the learning mode.

<Intra-Mode Processing>

In learning mode processing (step S716), the first control unit 223 performs learning which meets the preference of the user with use of a neural network based on respective pieces of operation information obtained at the external apparatus 301. The respective pieces of operation information obtained at the external apparatus 301 include, for example, information about image acquisition from the camera, information manually edited via a dedicated application, and determination value information input by the user with respect to images in the camera. Moreover, the first control unit 223 performs learning which meets the preference of the user with use of a neural network based on, for example, a notification about learning information from the external apparatus 301. Moreover, the first control unit 223 also concurrently performs learning about detection, such as registration of personal authentication, voice registration, sound scene registration, and general object recognition registration, and learning about, for example, conditions for the above-mentioned low power consumption mode.

(5) File Automatic Deletion Mode

<Mode Determination Condition>

If it is determined that file automatic deletion should be performed, based on a time elapsed from the previous file automatic deletion having been performed and the remaining capacity of the non-volatile memory 216 for recording images, the operation mode is set to the file automatic deletion mode.

<Intra-Mode Processing>

In file automatic deletion mode processing (step S718), the first control unit 223 designates a file which should be automatically deleted from the images stored in the non-volatile memory 216 based on, for example, tag information about each image and the date and time of capturing of each image, and deletes the designated file.

Details of processing in each of the above-mentioned modes are described below.

Referring back to the description in FIG. 7, if, in step S705, it is determined that the operation mode is not the low power consumption mode (NO in step S705), the first control unit 223 advances the processing to step S709, in which the first control unit 223 determines whether the mode setting is the automatic image capturing mode. If it is determined that the mode setting is the automatic image capturing mode (YES in step S709), the first control unit 223 advances the processing to step S710, in which the first control unit 223 performs automatic image capturing mode processing. Upon completion of the automatic image capturing mode processing, the first control unit 223 returns the processing to step S702, thus repeating the processing. If, in step S709, it is determined that the mode setting is not the automatic image capturing mode (NO in step S709), the first control unit 223 advances the processing to step S711.

In step S711, the first control unit 223 determines whether the mode setting is the automatic editing mode, and, if it is determined that the mode setting is the automatic editing mode (YES in step S711), the first control unit 223 advances the processing to step S712, in which the first control unit 223 performs automatic editing mode processing. Upon completion of the automatic editing mode processing, the first control unit 223 returns the processing to step S702, thus repeating the processing. If, in step S711, it is determined that the mode setting is not the automatic editing mode (NO in step S711), the first control unit 223 advances the processing to step S713. Furthermore, the automatic editing mode is not directly relevant to the gist of the present disclosure and the detailed description thereof is, therefore, omitted.

In step S713, the first control unit 223 determines whether the mode setting is the image automatic transfer mode, and, if it is determined that the mode setting is the image automatic transfer mode (YES in step S713), the first control unit 223 advances the processing to step S714, in which the first control unit 223 performs image automatic transfer mode processing. Upon completion of the image automatic transfer mode processing, the first control unit 223 returns the processing to step S702, thus repeating the processing. If, in step S713, it is determined that the mode setting is not the image automatic transfer mode (NO in step S713), the first control unit 223 advances the processing to step S715. Furthermore, the image automatic transfer mode is not directly relevant to the gist of the present disclosure and the detailed description thereof is, therefore, omitted.

In step S715, the first control unit 223 determines whether the mode setting is the learning mode, and, if it is determined that the mode setting is the learning mode (YES in step S715), the first control unit 223 advances the processing to step S716, in which the first control unit 223 performs learning mode processing. Upon completion of the learning mode processing, the first control unit 223 returns the processing to step S702, thus repeating the processing. If, in step S715, it is determined that the mode setting is not the learning mode (NO in step S715), the first control unit 223 advances the processing to step S717.

In step S717, the first control unit 223 determines whether the mode setting is the file automatic deletion mode, and, if it is determined that the mode setting is the file automatic deletion mode (YES in step S717), the first control unit 223 advances the processing to step S718, in which the first control unit 223 performs file automatic deletion mode processing. Upon completion of the file automatic deletion mode processing, the first control unit 223 returns the processing to step S702, thus repeating the processing. If, in step S717, it is determined that the mode setting is not the file automatic deletion mode (NO in step S717), the first control unit 223 returns the processing to step S702, thus repeating the processing. Furthermore, the file automatic deletion mode is not directly relevant to the gist of the present disclosure and the detailed description thereof is, therefore, omitted.

Figure 8:
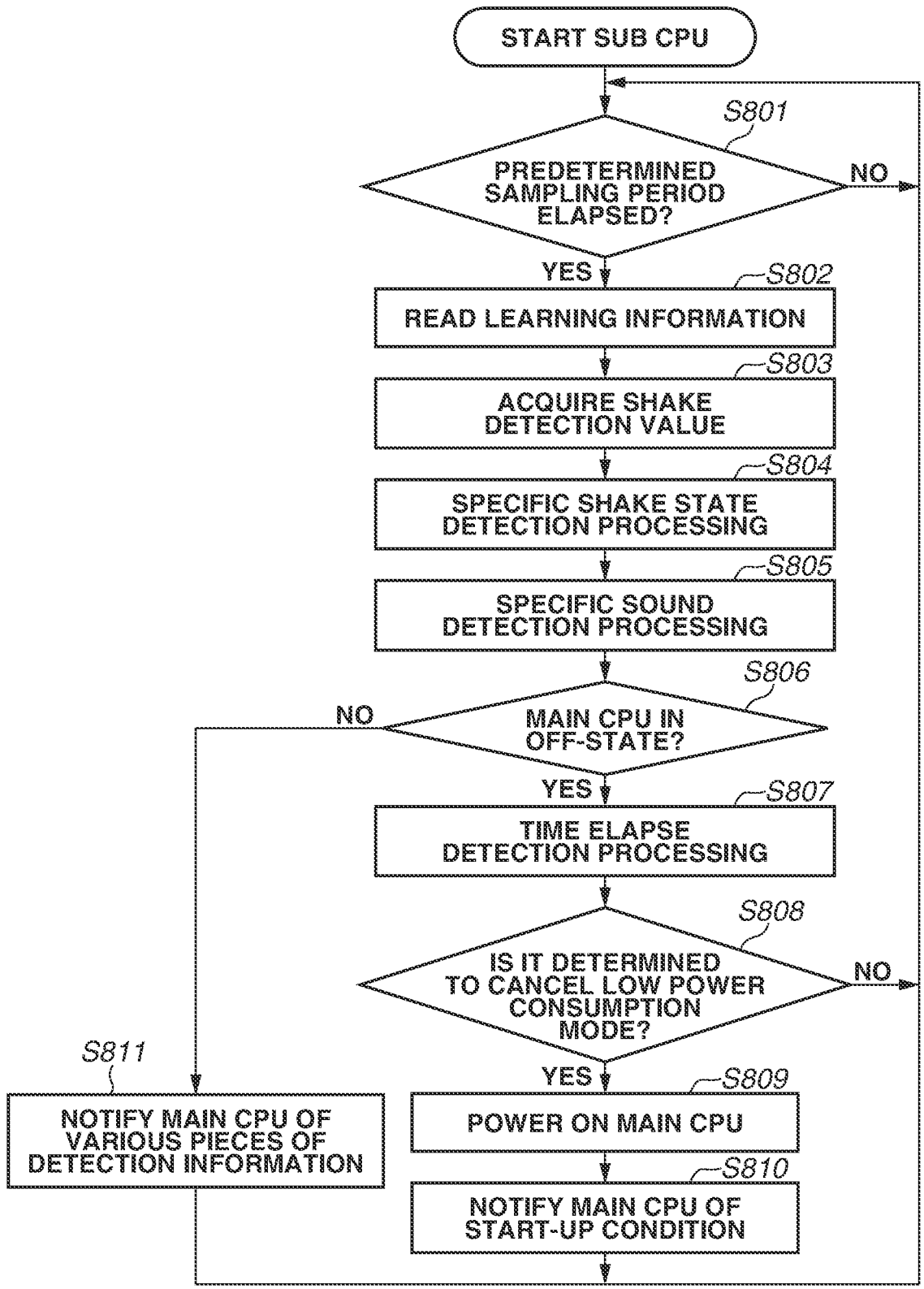
FIG. 8 is a flowchart illustrating an operation of a second control unit.

FIG. 8 is a flowchart illustrating an example of an operation which the second control unit 211 of the camera 101 handles in the present exemplary embodiment.

When the user operates a power button provided on the camera 101, electric power is supplied from the first power source unit 210 to the first control unit 223 and various blocks of the camera 101. Moreover, similarly, electric power is supplied from the second power source unit 212 to the second control unit 211.

When electric power is supplied, the second control unit (sub CPU) 211 is started up, so that the processing illustrated in FIG. 8 starts. In step S801, the second control unit 211 determines whether a predetermined sampling period has elapsed. The predetermined sampling period is set to, for example, 10 milliseconds (msec), so that the second control unit 211 advances the processing to step S802 with a period of 10 msec (YES in step S801). If it is determined that the predetermined sampling period has not yet elapsed (NO in step S801), the second control unit 211 waits in step S801.

In step S802, the second control unit 211 performs reading of learning information. The learning information, which is information transferred to the second control unit 211 in step S706 illustrated in FIG. 7, includes, for example, the following pieces of information:
(1) determination of specific shake detection (which is used in step S804 described below);
(2) determination of specific sound detection (which is used in step S805 described below); and
(3) determination of time elapse (which is used in step S807 described below).

Upon completion of reading of the learning information in step S802, the second control unit 211 advances the processing to step S803, in which the second control unit 211 acquires a shake detection value. The shake detection value is an output value from a gyroscope sensor or an acceleration sensor included in the apparatus shake detection unit 209.

Upon acquisition of the shake detection value in step S803, the second control unit 211 advances the processing to step S804, in which the second control unit 211 performs detection processing for a previously set specific shake state. Here, determination processing is changed depending on the learning information read in step S802. Some examples are described as follows.

<Tap Detection>

The state in which, for example, the user strikes the camera 101 with, for example, the fingertip (tap state) is able to be detected based on an output value of the acceleration meter 107 mounted in the camera 101. Passing an output of the three-axis acceleration meter 107 through a bandpass filter (BPF) set in a specific frequency domain with a predetermined sampling period enables extracting a signal region of acceleration change caused by tap. The second control unit 211 performs tap detection based on whether the number of times the acceleration signal passed through the BPF has exceeded a predetermined threshold value ThreshA within a predetermined time TimeA is a predetermined number of times CountA. In the case of double tap, the predetermined number of times CountA is set to 2, and, in the case of triple tap, the predetermined number of times CountA is set to 3. Moreover, the predetermined time TimeA and the predetermined threshold value ThreshA are able to be changed according to the learning information.

<Detection of Shake State>

The second control unit 211 is able to detect the shake state of the camera 101 based on output values of the angular velocity meter (gyroscope sensor) 106 and the acceleration meter (acceleration sensor) 107 mounted in the camera 101. The second control unit 211 cuts high-frequency components of the outputs of the gyroscope sensor 106 and the acceleration sensor 107 with a high-pass filter (HPF) and cuts low-frequency components thereof with a low-pass filter (LPF), and then performs absolute value conversion of such components. The second control unit 211 performs vibration detection based on whether the number of times the calculated absolute value has exceeded a threshold value ThreshB within a predetermined time TimeB is greater than or equal to a predetermined number of times CountB. This enables detecting whether the shake state is, for example, a state in which shake is small as the camera 101 being placed on, for example, a desk or a state in which shake is large as the camera 101 being worn as a wearable camera on the body of the user walking. Moreover, providing a plurality of determination threshold values or a plurality of conditions of the number of counts for determination also enables detecting a fine shake state corresponding to the level of shake. The predetermined time TimeB, the predetermined threshold value ThreshB, and the predetermined number of times CountB are able to be changed according to the learning information.

In the above description, the method of detecting a specific shake state by determining a detection value output from the shake detection sensor has been described. However, the second control unit 211 can also detect a previously registered specific shake state with a neural network caused to learn by inputting data output from the shake detection sensor sampled within a predetermined time to a shake state determination device using the neural network. In that case, the learning information read in step S802 serves as a weight parameter for the neural network.

Upon completion of detection processing for a specific shake state in step S804, the second control unit 211 advances the processing to step S805, in which the second control unit 211 performs detection processing for a previously set specific sound. Here, the second control unit 211 changes detection determination processing according to the learning information read in step S802. Some examples are described.

<Specific Voice Command Detection>

The second control unit 211 detects a specific voice command. The voice command includes some previously registered commands, and, in addition thereto, includes a specific sound which is registered by the user with the camera 101.

<Specific Sound Scene Recognition>

The second control unit 211 performs determination of a sound scene with a network caused to learn by machine learning. For example, the second control unit 211 detects specific scenes, such as "a cheer is arising", "clapping is being performed", and "a sound is being uttered". A scene to be detected varies depending on learning.

<Sound Level Determination>

The second control unit 211 performs detection of a sound level by determining whether the magnitude of sound level exceeds a predetermined magnitude within a predetermined value. For example, the predetermined value or the predetermined magnitude varies depending on learning.

<Sound Direction Determination>

The second control unit 211 detects a sound direction about a sound with a predetermined magnitude by a plurality of microphones arranged on a plane surface.

The second control unit 211 performs the above-mentioned determination processing within the audio processing unit 214, and determines whether a specific sound has been detected according to the respective previously learned settings in step S805.

Upon completion of detection processing for a specific sound in step S805, the second control unit 211 advances the processing to step S806, in which the second control unit 211 determines whether the power source of the first control unit 223 is in an OFF-state. If it is determined that the power source of the first control unit 223 (main CPU) is in an OFF-state (YES in step S806), the second control unit 211 advances the processing to step S807, in which the second control unit 211 performs time elapse detection processing for a previously set time. Here, the second control unit 211 changes detection determination processing depending on the learning information read in step S802. The learning information is information transferred when the first control unit 223 communicates information to the second control unit 211 in step S706 illustrated in FIG. 7. The elapsed time from when the first control unit 223 has transitioned from ON to OFF is measured, and, if the measured elapsed time is greater than or equal to a predetermined time TimeC, the second control unit 211 determines that the time has elapsed, and, if the measured elapsed time is less than the predetermined time TimeC, the second control unit 211 determines that the time has not yet elapsed. The predetermined time TimeC is a parameter which changes depending on learning information.

Upon completion of the time elapse detection processing in step S807, the second control unit 211 advances the processing to step S808, in which the second control unit 211 determines whether a condition for cancelling the low power consumption mode has been met. Cancellation of the low power consumption mode is determined by the following conditions:
(1) a specific shake having been detected;
(2) a specific sound having been detected; and
(3) a predetermined time having elapsed.

With regard to the condition (1), whether a specific shake has been detected is determined by the specific shake state detection processing in step S804. With regard to the condition (2), whether a specific sound has been detected is determined by the specific sound detection processing in step S805. With regard to the condition (3), whether a predetermined time has elapsed is determined by the time elapse detection processing in step S807. If at least one of the conditions (1) to (3) is met, the second control unit 211 determines to cancel the low power consumption mode (YES in step S808).

Upon determination of cancellation of the low power consumption in step S808, the second control unit 211 advances the processing to step S809, in which the second control unit 211 turns on the power source of the first control unit 223, and, then in step S810, the second control unit 211 notifies the first control unit 223 of the condition based on which cancellation of the low power consumption mode has been determined (any one of shake, sound, and time). Then, the second control unit 211 returns the processing to step S801, thus performing loop processing. If it is determined that none of the cancellation conditions is met in step S808 and, thus, no condition for cancelling the low power consumption mode has been met (NO in step S808), the second control unit 211 returns the processing to step S801, thus performing loop processing.

On the other hand, if, in step S806, it is determined that the power source of the first control unit 223 is in an ON-state (NO in step S806), the second control unit 211 advances the processing to step S811, in which the second control unit 211 notifies the first control unit 223 of pieces of information acquired in steps S803 to S805, and then returns the processing to step S801, thus performing loop processing.

In the present exemplary embodiment, a configuration in which, even in a case where the power source of the first control unit 223 is in an ON-state, detection of shake and detection of a specific sound are performed by the second control unit 211 and results of such detection are communicated to the first control unit 223 is employed. However, a configuration in which, in a case where the power source of the first control unit 223 is in an ON-state, processing in steps S803 to S805 is not performed and detection of shake and detection of a specific sound are performed in processing within the first control unit 223 (step S702 illustrated in FIG. 7) can be employed.

As mentioned above, performing steps S704 to S707 illustrated in FIG. 7 and processing illustrated in FIG. 8 causes a condition for transitioning to the low power consumption mode and a condition for cancelling the low power consumption mode to be learned based on an operation of the user. Then, this enables the user of the camera 101 to perform a camera operation conforming to the usability for the user. The method of learning is described below.

Furthermore, while, in the above description, the method of cancelling the low power consumption mode depending on shake detection, sound detection, or time elapse has been described in detail, the low power consumption mode can be cancelled depending on environmental information. The environmental information is able to be determined based on whether temperature, atmospheric pressure, brightness, humidity, or the absolute amount or change amount in amount of ultraviolet light has exceeded a predetermined threshold value, and the threshold value is also able to be changed by learning described below.

Moreover, detection information about shake detection, sound detection, or time elapse or the absolute amount or change amount in each piece of environmental information can be determined based on a neural network, and the determination as to whether to cancel the low power consumption mode can be performed based on the determined information. Such determination processing is able to change a determination condition by learning described below.

<Automatic Image Capturing Mode Processing>

Automatic image capturing mode processing is described with reference to FIG. 9. First, in step S901, the first control unit 223 causes the image processing unit 207 to perform image processing on a signal captured by the image pickup device 206 to generate an image for subject detection. Subject detection processing for detecting a person or object is performed on the generated image.

In the case of detecting a person, the first control unit 223 detects the face or human body of a subject. With regard to face detection processing, a pattern for determining the face of a person is defined in advance, and the first control unit 223 is able to detect, as the face region of a person, a portion which matches the pattern in a captured image. Moreover, the first control unit 223 also concurrently detects the degree of reliability indicating the probability as a face of a subject. The degree of reliability is calculated from, for example, the size of a face region in the image or the degree of matching with the face pattern. Also, with regard to object recognition, similarly, the first control unit 223 is able to recognize an object which matches a previously registered pattern.

Moreover, there is also, for example, a method of extracting a characteristic subject by using a histogram of, for example, hue or saturation in a captured image. In this method, with regard to an image of a subject shown in the image capturing angle of view, processing for dividing a distribution derived from the histogram of, for example, hue or saturation of the image into a plurality of sections and classifying the captured image for each section is performed. For example, with respect to a captured image, a histogram of a plurality of color components is generated, a distribution derived from the histogram is sectioned by mountain-shaped distribution ranges, images captured in regions belonging to the same section are classified, and an image region for the subject is recognized. An evaluation value is calculated for each recognized image region for the subject, so that an image region for the subject the evaluation value of which is highest can be determined as a main subject region. With the above-mentioned method, each piece of subject information can be obtained from image capturing information.

In step S902, the first control unit 223 performs calculation of an image shake correction amount. Specifically, first, the first control unit 223 calculates the absolute angle of a shake of the camera 101 based on the angular velocity and acceleration information acquired by the apparatus shake detection unit 209. Then, the first control unit 223 calculates an angle required to correct an image shake by moving the tilt rotation unit 104 and the pan rotation unit 105 in a direction to cancel out the calculated absolute value, and sets the calculated angle as an image shake correction amount. Furthermore, the image shake correction amount calculation processing is able to be changed in calculation method by learning processing described below.

In step S903, the first control unit 223 performs state determination for the camera 101. The first control unit 223 determines in what vibration or movement state the camera 101 is currently based on, for example, the camera angle and camera movement amount detected from, for example, angular velocity information, acceleration information, and GPS location information. For example, in a case where image capturing is performed with the camera 101 mounted on a vehicle, subject information, such as a surrounding landscape, greatly changes depending on the distance by which the vehicle moves. Therefore, the first control unit 223 determines whether the camera state is a "vehicle movement state", in which the camera 101 is moving at a speed higher than a predetermined speed while being mounted on, for example, a vehicle, and uses a result of such determination for automatic subject search described below. Moreover, the first control unit 223 determines whether a change in angle of the camera 101 is greater than a predetermined value, and thus determines whether the camera state is a "standing capturing state", in which there is almost no shake in the camera 101. In a case where the camera state is the "standing capturing state", since it can be considered that there is no change in position of the camera 101 itself, the first control unit 223 is able to perform subject search for standing capturing. Moreover, in a case where a change in angle of the camera 101 is relatively large (in a case where the change in angle of the camera 101 is larger than a predetermined threshold value), it is determined that the camera state is a "hand-held state", so that the first control unit 223 is able to perform subject search for hand-held capturing.

In step S904, the first control unit 223 performs subject search processing. The subject search is configured with the following processing operations:
(1) area segmentation;
(2) calculation of an importance level for each area; and
(3) determination of a search target area.

Figure 10A:
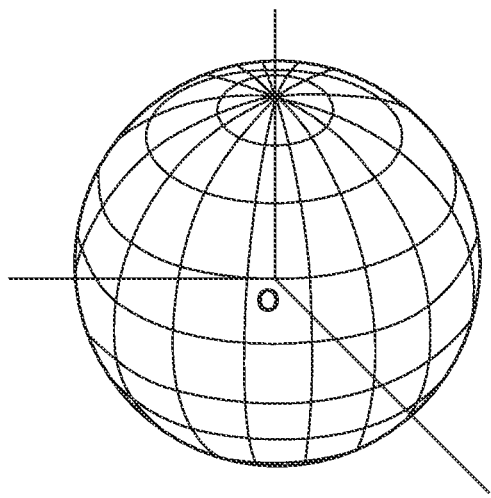
FIGS. 10Aa, 10Ab, 10Ac, and 10Ad are diagrams used to explain area segmentation in a captured image.
Figure 10A:
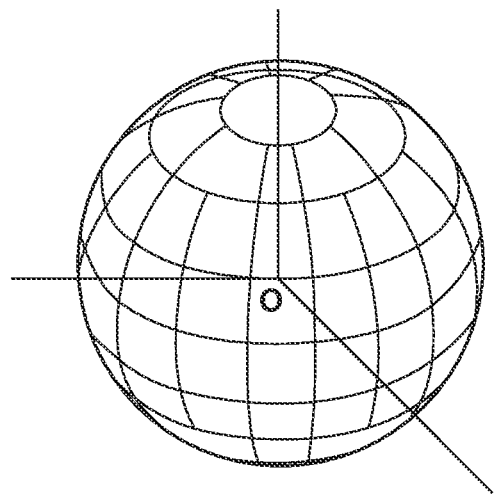
Figure 10A:
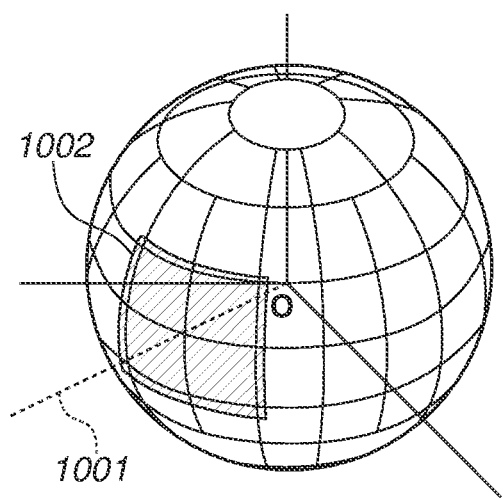
Figure 10A:
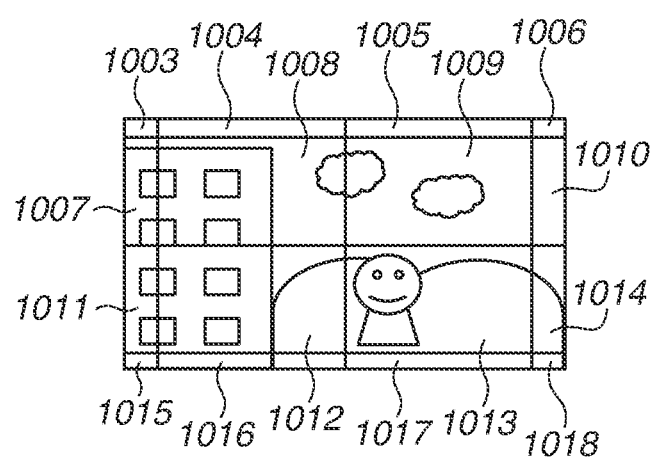

In the following description, the respective processing operations are described in sequence.
(1) Area Segmentation Area segmentation is described with reference to FIGS. 10Aa, 10Ab, 10Ac, and 10Ad. The first control unit 223 performs area segmentation in the entire circumference centering on the camera position (the origin O being set as the camera position) as illustrated in FIG. 10Aa. In the example illustrated in FIG. 10Aa, segmentation is performed with respect to the tilt direction and the pan direction at intervals of 22.5 degrees. When segmentation is performed as illustrated in FIG. 10Aa, as the angle in the tilt direction moves away from 0 degrees, the circumference in the horizontal direction becomes smaller, so that the area region also becomes smaller. Therefore, in a case where the tilt angle is greater than or equal to 45 degrees, the area range in the horizontal direction is set larger than 22.5 degrees as illustrated in FIG. 10Ab.

FIGS. 10Ac and 10Ad illustrate an example of regions obtained by area segmentation in the captured angle of view. An axis 1001 indicates the direction of the camera 101 obtained at the time of initialization, and area segmentation is performed with this direction used as a reference position. A region 1002 indicates a view angle area of an image which is being captured, and FIG. 10Ad illustrates an example of the image which is being captured. In the image which is captured within the angle of view, the image is segmented as illustrated by reference characters 1003 to 1018 illustrated in FIG. 10Ad.
(2) Calculation of Importance Level for Each Area With respect to each area obtained by segmentation in the above-described way, the first control unit 223 calculates an importance level indicating the order of priority for performing search according to the status of a subject or the status of a scene present in the area. The importance level that is based on the status of a subject is calculated based on, for example, the number of persons present in the area, the size of the face of a person, the direction of a face, the degree of certainty of face detection, a person's expression, or a personal authentication result of a person. Moreover, the importance level that is based on the status of a scene is calculated based on, for example, a general object recognition result, a scene discrimination result (for example, blue sky, backlight, or evening view), the level of sound coming from the direction of the area or a voice recognition result, or movement detection information in the area.

Figure 9:
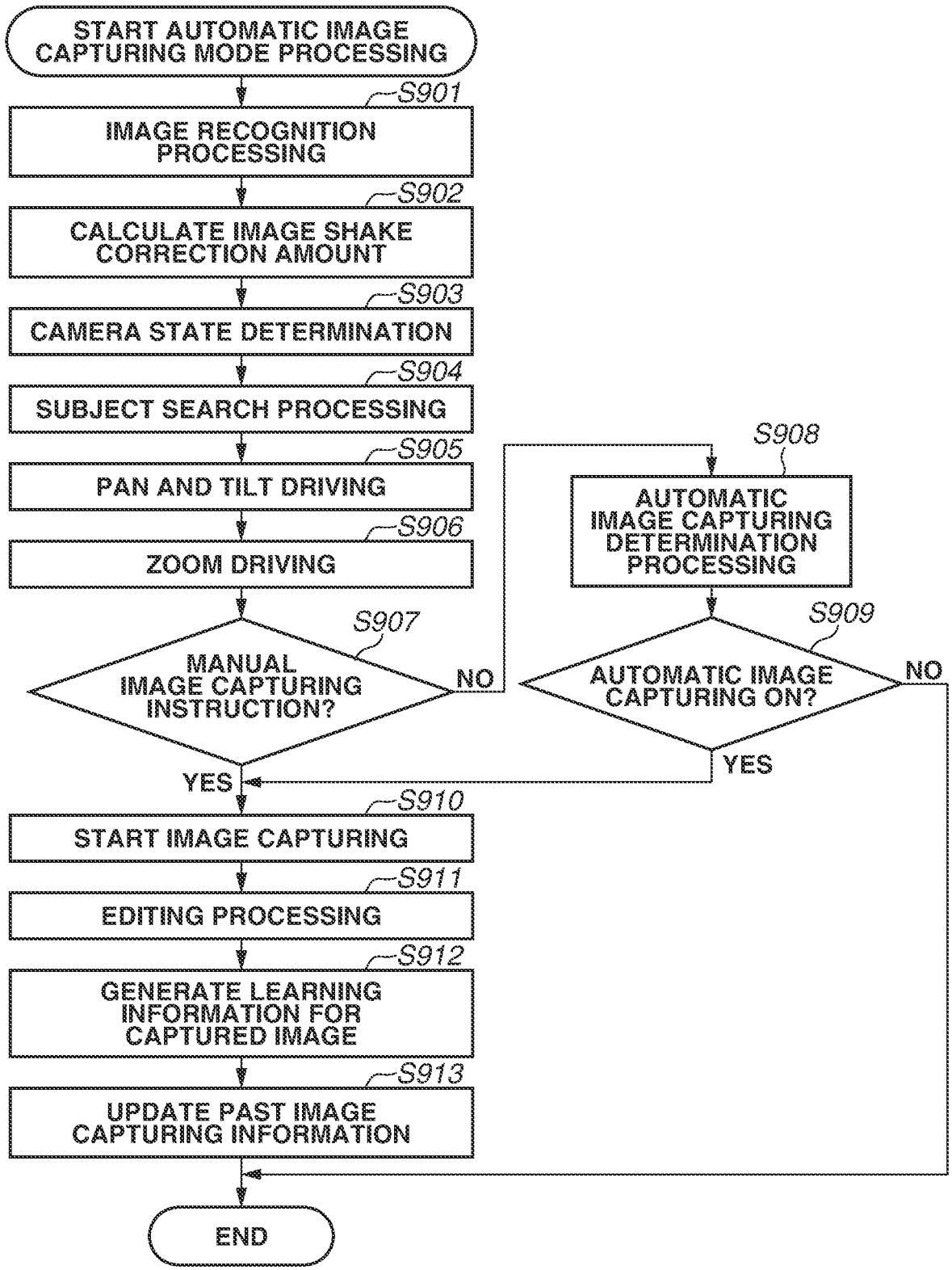
FIG. 9 is a flowchart illustrating an operation for automatic image capturing mode processing.

Moreover, in a case where a vibration of the camera is detected in the camera state determination (step S903) illustrated in FIG. 9, the importance level can also be configured to vary according to the vibration state. For example, in a case where the camera state has been determined to be a "standing capturing state", it is determined that subject search is performed centering on a subject high in degree of priority among persons registered for face authentication (for example, the owner of the camera). Moreover, automatic image capturing described below is also performed while prioritizing, for example, the owner of the camera. With this configuration, even when the amount of time in which the owner of the camera is performing image capturing while wearing and carrying the camera is large, if the owner takes off and places the camera, for example, on a desk enables also acquiring a large number of images in which the owner is shown. Since, at this time, it is possible to search for a face using pan and tilt, only suitably placing the camera without consideration of, for example, a placement angle of the camera enables acquiring, for example, an image in which the owner is shown or a group photograph in which many faces are shown.

Furthermore, if only the above-mentioned condition is employed, unless there is a change in each area, an area highest in importance level becomes the same, and, as a result, the area to be found by search may remain unchanged. Therefore, the importance level is caused to vary according to past image capturing information. Specifically, the importance level of an area which has continued being designated as a search area for a predetermined time can be lowered, or the importance level of an area in which image capturing has been performed in step S910 described below can be lowered for a predetermined time.
(3) Determination of Search Target Area Upon completion of calculation of the importance level for each area as described above, the first control unit 223 determines an area high in importance level as a search target area. Then, the first control unit 223 calculates pan and tilt search goal angles required to cover the search target area within the angle of view.

Referring back to the description of FIG. 9, in step S905, the first control unit 223 performs pan and tilt driving. Specifically, the first control unit 223 calculates a pan and tilt driving amount by adding an image shake correction amount in a control sampling frequency and a driving angle that is based on the pan and tilt search goal angle. Then, the first control unit 223 causes the lens barrel rotation driving unit 205 to perform drive control of the tilt rotation unit 104 and the pan rotation unit 105.

In step S906, the first control unit 223 controls the zoom unit 201 to perform zoom driving. Specifically, the first control unit 223 performs zoom driving according to the state of the search target subject determined in step S904. For example, in a case where the search target subject is the face of a person, if the face on an image is too small, the face may not be able to be detected because of falling below the detectable minimum size and thus may be lost from sight. In such a case, the first control unit 223 performs control to effect zoom toward the telephoto side in such a way as to increase the size of the face on an image. On the other hand, if the face on an image is too large, the subject may become likely to deviate from the angle of view due to the motion of the subject or the camera itself. In such a case, the first control unit 223 performs control to effect zoom toward the wide-angle side in such a way as to decrease the size of the face on an image. Performing zoom control in the above-described way enables maintaining a state suitable for tracking a subject.

In step S907, the first control unit 223 determines whether a manual image capturing instruction has been received, and, if it is determined that a manual image capturing instruction has been received (YES in step S907), the first control unit 223 advances the processing to step S910. At this time, the manual image capturing instruction can be any one of an instruction caused by pressing of a shutter button, an instruction caused by lightly striking (tapping) the camera housing with, for example, the finger, an instruction caused by inputting of a voice command, and an instruction received from an external apparatus. The image capturing instruction caused by a tap operation as a trigger is determined by the apparatus shake detection unit 209 detecting a high-frequency acceleration which has continued within a short period when the user taps the camera housing. The inputting of a voice command is an image capturing instruction method in which, when the user utters a predetermined watchword for an image capturing instruction (for example, "take a photo"), the audio processing unit 214 recognizes the voice as a trigger for image capturing. The instruction received from an external apparatus is an image capturing instruction method in which, for example, a shutter instruction signal transmitted via a dedicated application from, for example, a smartphone Bluetooth-connected to the camera is used as a trigger.

If, in step S907, it is determined that no manual image capturing instruction has been received (NO in step S907), the first control unit 223 advances the processing to step S908, in which the first control unit 223 performs automatic image capturing determination. The automatic image capturing determination includes a determination as to whether to perform automatic image capturing and a determination of an image capturing method (a determination as to which of, for example, still image capturing, moving image capturing, continuous shooting, and panorama image capturing to perform).

<Determination as to Whether to Perform Automatic Image Capturing>

The determination as to whether to perform automatic image capturing (an image capturing operation to record image data output from the image pickup device 206) is performed as described below. Specifically, in the following two cases, the first control unit 223 determines to perform automatic image capturing. In the first case, when, with regard to importance levels for respective areas obtained in step S904, there is an area the importance level of which exceeds a predetermined value, the first control unit 223 determines to perform automatic image capturing with respect to such an area. In the second case, the first control unit 223 performs a determination that is based on a neural network, which is described below. Furthermore, recording as used herein can be recording of image data on the memory 215 or can be recording of image data on the non-volatile memory 216. Moreover, recording also includes automatically transferring image data to the external apparatus 301 and recording the image data on the external apparatus 301.

While, in the present exemplary embodiment, as mentioned above, control is performed to automatically perform image capturing by automatic image capturing determination processing such as that using a neural network, depending on the situation or the status of the camera, it may be better to change a determination parameter for automatic image capturing.

Unlike image capturing to be performed at intervals of a predetermined time, with regard to automatic image capturing control that is based on the situation determination, the following situations are likely to be favorable:
(1) a situation in which the user wants to capture as large a number of images as possible including persons and things;
(2) a situation in which the user does not want to fail to capture a memorable scene; and
(3) a situation in which the user wants to perform energy-saving image capturing in consideration of the remaining charge amount of a battery and the remaining capacity of a recording medium.

In automatic image capturing, the first control unit 223 calculates an evaluation value from the state of a subject, compares the evaluation value with a threshold value, and, if the evaluation value exceeds the threshold value, performs automatic image capturing. Furthermore, the evaluation value for automatic image capturing is determined by a determination performed with use of a learning result obtained up to that time or a neural network.

Figure 10B:
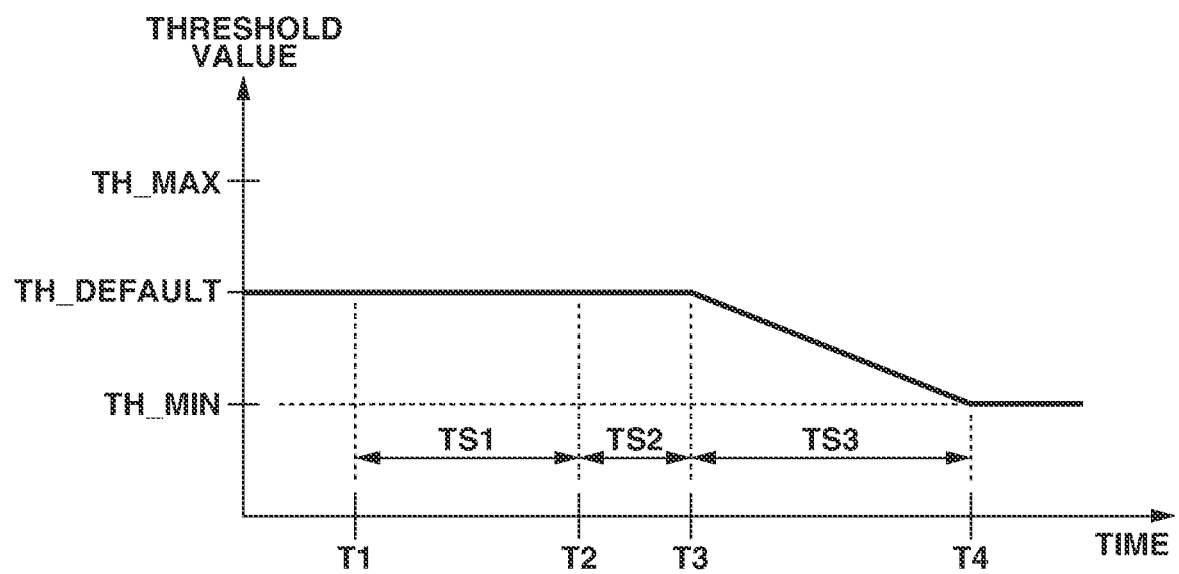
FIG. 10B is a diagram used to explain control of the image capturing frequency.

In an example illustrated in FIG. 10B, the horizontal axis indicates elapsed time and the vertical axis indicates a determination threshold value for automatic image capturing. The threshold value is designed to gradually decrease after a state in which image capturing is not performed continues for a predetermined time. The reason to perform such an adjustment is because it is conceivable that, even if the status of a subject is not necessarily a scene suitable for image capturing, performing an image capturing operation a given number of times enables performing image capturing almost evenly over the entire image capturing.

In the example illustrated in FIG. 10B, the first control unit 223 measures an elapsed time from the time of completion of image capturing, gradually decreases the threshold value from an initial value TH_DEFAULT after elapsed time T3 is reached, and, as time passes, gradually decreases the determination threshold value to a value TH_MIN. Performing image capturing at intervals of a predetermined time irrespective of the status of a subject may result in a video image which becomes detached from a video image which the user wants to capture. Gradually decreasing the determination threshold value enables performing control to come closer to a video image which the user wants to capture.

Figure 10C:
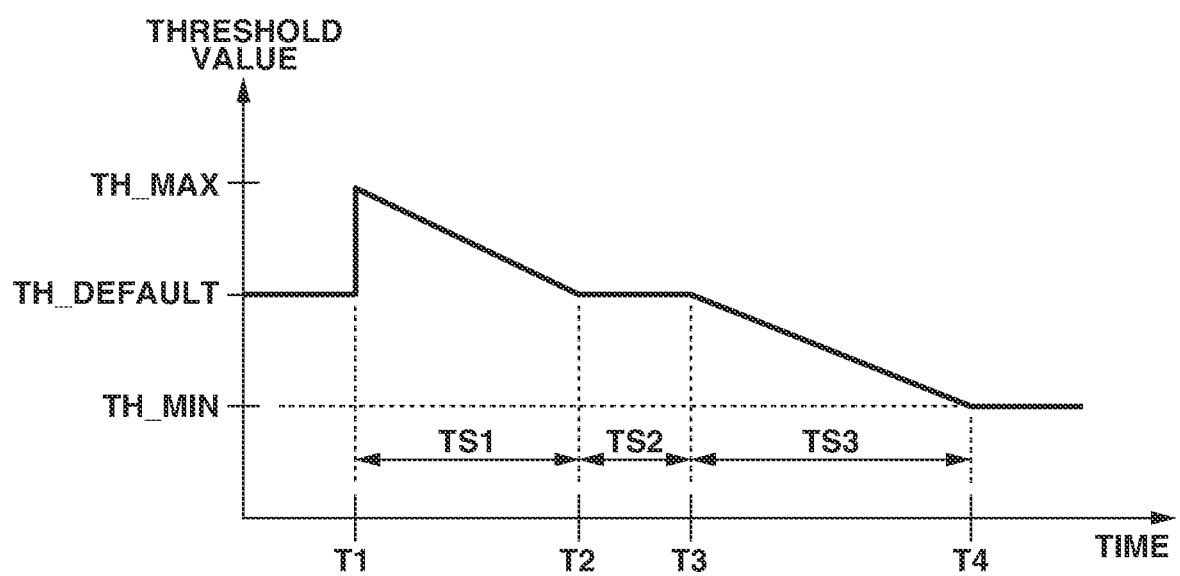
FIG. 10C is a diagram used to explain control of the image capturing frequency.

Additionally, an example illustrated in FIG. 10C represents a case where an image capturing operation has been performed at the time point of elapsed time T1. The first control unit 223 evaluates a change in evaluation value of automatic image capturing stored as image capturing history information, and, if the evaluated change indicates a decreasing tendency or indicates a slight change, sets the determination threshold value to a value TH_MAX. Moreover, as time passes, the first control unit 223 gradually decreases the determination threshold value.

On the other hand, in a case where the evaluation value is determined to have an increasing tendency in image capturing performed at elapsed time T1, the determination threshold value has a motion similar to that illustrated in FIG. 10B, and the determination threshold value is kept to the initial value TH_DEFAULT.

The main CPU, which controls the camera 101 in the present exemplary embodiment, has a detection function of detecting the face of a subject based on image information. Moreover, the main CPU has a determination function of calculating an evaluation value by recognizing the expression of the face and inputting, for example, the state of a specific expression (for example, the state in a case where a characteristic value of the state of joy, sadness, anger, or surprise has exceeded a threshold value) and determining automatic image capturing. Additionally, the main CPU has a control function of performing control to perform a subject recording operation (automatic image capturing) according to a determination result of the determination function. In this case, the main CPU adjusts the determination threshold value for automatic image capturing according to an elapsed time and an evaluation value. Performing this adjustment enables performing image capturing of various expressions by maintaining the determination threshold value in a case where the calculated evaluation value has an increasing tendency, thus preventing a failure to perform image capturing. On the other hand, in a case where a change in evaluation value is slight or the evaluation value has a decreasing tendency, the main CPU temporarily increases the determination threshold value, thus performing control not to perform an image capturing operation. This enables preventing or reducing a failure to perform image capturing and reducing the insufficiency of capacity of a recording memory.

Another determination control example for automatic image capturing is described with reference to FIG. 10D. In the example illustrated in FIG. 10D, the determination threshold value in a period from the time when an image capturing operation is performed to elapsed time T1 is set to a value TH_MAX. Performing this adjustment enables reducing an issue in which an image capturing operation being performed in a row immediately after the start of image capturing causes generation of too many similar images.

Moreover, FIG. 10E illustrates a control example in which the threshold value is changed according to a detection result of the shake state of the camera 101. In a case where the camera 101 is mounted as a wearable camera, the state of a behavior may not become continuous in a time-series manner only by image capturing determination in determination for automatic image capturing. In the example illustrated in FIG. 10E, after elapsed time T3 passes, the main CPU gradually decreases the threshold value and then changes the threshold value to zero at the time point of elapsed time T4. This means that, in a case where an image capturing operation is not performed until elapsed time T4, an image capturing operation is set to be performed irrespective of the evaluation value for automatic image capturing.

In this way, controlling an image capturing frequency according to an elapsed time from the latest image capturing or an image capturing situation such as the state of an apparatus, for example, "vehicle movement state", "standing capturing state", "hand-held state", or "wearable state", enables performing automatic image capturing capable of obtaining an appropriate number of captured images.

Furthermore, while, in the above description, an image capturing frequency is controlled to be changed according to an image capturing situation, a determination threshold value used for determining still image capturing and a determination threshold value used for starting moving image capturing can be separately stored and controlled.

Figure 11:
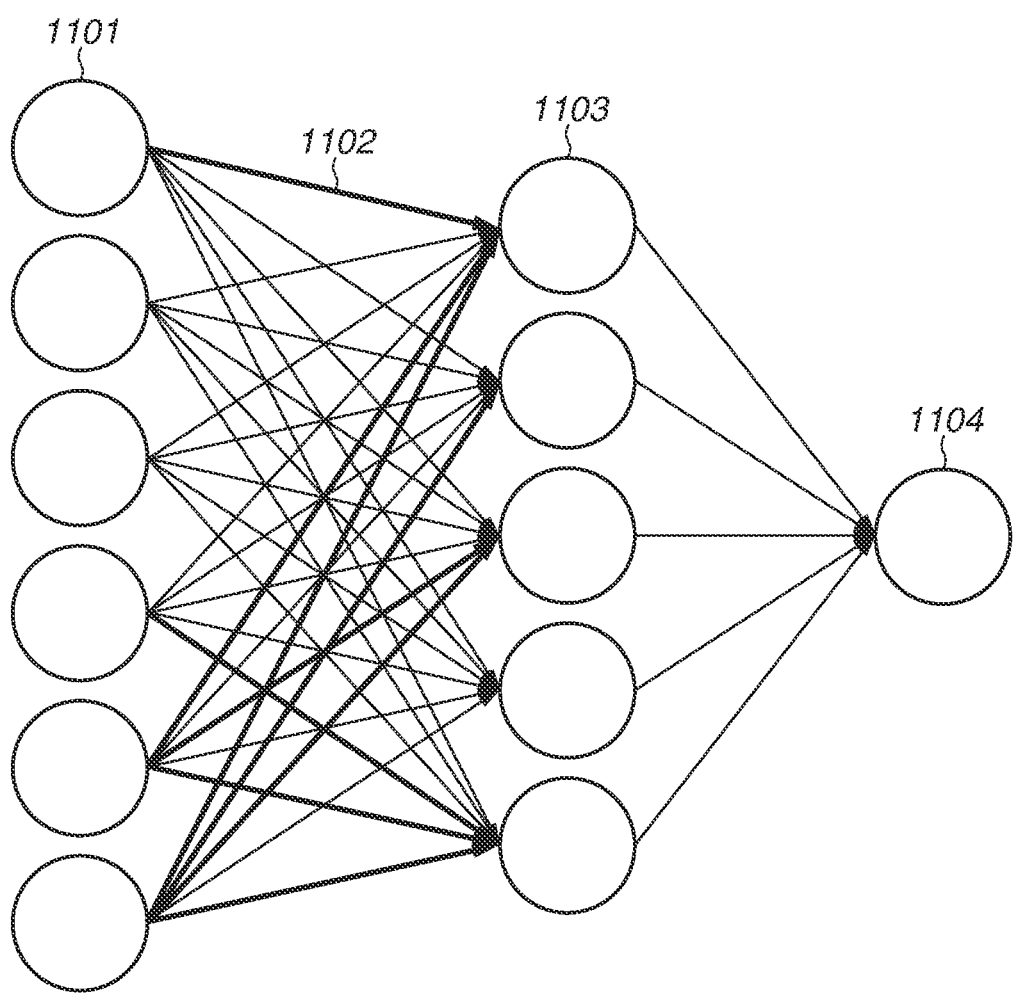
FIG. 11 is a diagram used to explain a neural network.

Next, the determination that is based on a neural network, which is the second determination for determining automatic image capturing, is described. FIG. 11 illustrates an example of a network configured with a multilayer perceptron as an example of a neural network. The neural network is a network used to predict an output value from an input value, and, by previously learning an input value and an output value serving as an exemplar relative to the input value, is able to estimate an output value which follows the learned exemplar relative to a new input value. Furthermore, the method of learning is described below. In the neural network illustrated in FIG. 11, a circle 1101 and circles vertically arranged side by side therewith indicate neurons of an input layer, a circle 1103 and circles vertically arranged side by side therewith indicate neurons of an intermediate layer, and a circle 1104 indicates a neuron of an output layer. Arrows 1102 indicate connections which interconnect respective neurons. In a determination that is based on the neural network, feature amounts that are based on a subject shown in the current angle of view and the states of a scene and the camera are given as inputs to neurons of the input layer, and a value output from the output layer via computations that are based on the forward propagation formula of a multilayer perceptron is obtained. Then, if the output value is greater than or equal to a threshold value, a determination to perform automatic image capturing is made. Furthermore, features of a subject include a general object recognition result in the current zoom magnification and the current angle of view. Moreover, features of a subject further include a face detection result, the number of faces shown in the current angle of view, the degree of smile of a face, the degree of eye closure, the face angle, a face authentication identification (ID) number, the angle of a line of sight of a subject person, a scene discrimination result, an elapsed time from the time of previous image capturing, and the current time. Moreover, features of a subject further include, for example, GPS location information, a change amount from the previous image capturing position, the current voice level, a person uttering a voice, information indicating whether a cheer or joy is arising, vibration information (acceleration information and camera state), and environmental information (temperature, atmospheric pressure, illuminance, humidity, and the amount of ultraviolet light). Additionally, in a case where information is communicated from the external apparatus 501, the communicated information (motion information about the user, action information about the arm, and biological information such as heart rate) can also be used as the features. These features are converted into numerical values in a predetermined range, and the numerical values are given as feature amounts to respective neurons of the input layer. Therefore, a number of neurons of the input layer corresponding to the number of the above-mentioned usable features are required.

Furthermore, in the determination that is based on a neural network, the output value is able to be changed by changing connection weights between the respective neurons in learning processing described below, so that a result of determination can be adapted to a learning result.

Moreover, a determination for automatic image capturing also changes according to a start-up condition for the first control unit 223 read in step S702 illustrated in FIG. 7. For example, in the case of start-up by tap detection or start-up by a specific voice command, this operation has a very high probability of being an operation which the user performs because of wanting to currently perform image capturing. Therefore, setting is performed in such a manner that an image capturing frequency becomes high.

<Determination of Image Capturing Method>

In the determination of an image capturing method, the first control unit 223 determines which of, for example, still image capturing, moving image capturing, continuous shooting capturing, and panorama image capturing to perform based on the state of the camera and the state of a surrounding subject detected in steps S901 to S904. For example, in a case where a subject (person) stands still, the first control unit 223 performs still image capturing, and, in a case where a subject is moving, the first control unit 223 performs moving image capturing or continuous shooting capturing. Moreover, in a case where there is a plurality of subjects in such a way as to surround the camera, the first control unit 223 can perform panorama image capturing processing, which generates a panorama image by combining sequentially captured images while performing pan and tilt operations. Moreover, in a case where the image capturing location has been determined to be a picturesque place based on the above-mentioned GPS information, the first control unit 223 can also perform panorama image capturing processing while performing pan and tilt operations. Furthermore, similar to <Determination as to whether to perform automatic image capturing>, the first control unit 223 can determine various pieces of information detected before image capturing based on a neural network and then determine an image capturing method. Moreover, in this determination processing, the first control unit 223 can change a determination condition according to learning processing described below.

Referring back to the description of FIG. 9, if, in step S909, it is determined that the determination to perform automatic image capturing has been made by the automatic image capturing determination performed in step S908 (YES in step S909), the first control unit 223 advances the processing to step S910, and, if it is determined that the determination to perform automatic image capturing has not been made (NO in step S909), the first control unit 223 ends the automatic image capturing mode processing.

In step S910, the first control unit 223 starts automatic image capturing. At this time, the first control unit 223 starts image capturing according to the image capturing method determined in step S908. At that time, the first control unit 223 causes the focus driving control unit 204 to perform autofocus control. Moreover, the first control unit 223 causes a diaphragm control unit, a sensor gain control unit, and a shutter control unit (each not illustrated) to perform exposure control in such a manner that a subject has an appropriate brightness. Additionally, after image capturing, the first control unit 223 causes the image processing unit 207 to perform various known image processing operations, such as automatic white balance processing, noise reduction processing, and gamma correction processing, thus generating an image.

Furthermore, a configuration in which, during this image capturing, in a case where a predetermined condition is satisfied, the camera 101 performs image capturing after notifying a person targeted for image capturing of starting image capturing of the person can be employed. The method of notification can include, for example, emitting a sound from the audio output unit 218 and using lighting-up of an LED by the LED control unit 224. The predetermined condition includes, for example, the number of faces in the angle of view, the degree of smile of a face, the degree of eye closure, the angle of a line of sight and the face angle of a subject person, a face authentication ID number, the number of persons registered in personal authentication, a general object recognition result during image capturing, a scene discrimination result, an elapsed time from the time of previous image capturing, and image capturing time. Moreover, the predetermined condition further includes, for example, information indicating whether the current position that is based on GPS information is a picturesque place, a sound level during image capturing, the presence or absence of a person uttering a voice, information indicating whether a cheer or joy is raising, vibration information (acceleration information and camera state), and environmental information (temperature, atmospheric pressure, illuminance, humidity, the amount of ultraviolet light). Performing notification image capturing based on these conditions enables acquiring favorable images with a subject looking into the camera in a scene of high importance.

Even in such a notification prior to image capturing, the method of notification or the timing thereof can be determined by determining information about a captured image or various pieces of information detected prior to image capturing based on a neural network. Moreover, in this determination processing, the determination condition can be changed according to learning processing described below.

In step S911, the first control unit 223 performs editing processing, such as modifying an image generated in step S910 or adding the generated image to a moving image. Specifically, image modification includes, for example, cropping processing that is based on the face of a person or an in-focus position, rotation processing of an image, high dynamic range (HDR) effect processing, bokeh effect processing, and color conversion filter effect processing. In image modification, the first control unit 223 can generate a plurality of modified images by a combination of the above-mentioned processing operations based on an image generated in step S910 and store the generated plurality of modified images separately from the image generated in step S910. Moreover, in moving image processing, the first control unit 223 can also perform such processing as to add a captured moving image or still image to a generated edited moving image while applying thereto special effect processing, such as slide, zoom, or fade. Even in editing performed in step S911, the first control unit 223 can determine information about a captured image or various pieces of information detected prior to image capturing based on a neural network and determine the method of image modification. Moreover, in this determination processing, the first control unit 223 can change the determination condition according to learning processing described below.

In step S912, the first control unit 223 performs learning information generation processing for a captured image. Here, the first control unit 223 generates and records information which is to be used for learning processing described below. Specifically, the information includes, in a currently captured image, a zoom magnification during image capturing, a general object recognition result during image capturing, a face detection result, the number of faces shown in the captured image, the degree of smile of a face, the degree of eye closure, the face angle, a face authentication ID number, and the angle of a line of sight of a subject person. Moreover, the information further includes a scene discrimination result, an elapsed time from the time of previous image capturing, and image capturing time. Moreover, the information further includes, for example, GPS location information, a change amount from the previous image capturing position, a voice level during image capturing, a person uttering a voice, and information indicating whether a cheer or joy is arising. Moreover, the information further includes, for example, vibration information (acceleration information and camera state), environmental information (temperature, atmospheric pressure, illuminance, humidity, and the amount of ultraviolet light), a moving image capturing time, and information indicating whether image capturing has been caused by a manual image capturing instruction. Additionally, the first control unit 223 also calculates a score which is an output of the neural network obtained by quantifying a preference of the user for images. The first control unit 223 generates these pieces of information and then records the generated pieces of information as tag information in a captured image file. Alternatively, the first control unit 223 can write the generated pieces of information in the non-volatile memory 216 or store, in the recording medium 221, the generated pieces of information as what is called catalog data in a form in which pieces of information about respective captured images are listed.

In step S913, the first control unit 223 performs updating of past image capturing information. Specifically, the first control unit 223 increases by one a count of the number of images corresponding to the currently captured image with respect to the number of captured images for each area described in step S908, the number of captured images for each person registered in personal authentication, the number of captured images for each subject recognized in general object recognition, or the number of captured images for each scene in scene discrimination. Moreover, at the same time, the first control unit 223 stores image capturing time in the current image capturing and an evaluation value of automatic image capturing to be retained as image capturing history information.

<Learning Processing>

Next, learning which meets preference of the user in the present exemplary embodiment is described. In the present exemplary embodiment, using a neural network such as that illustrated in FIG. 11, the learning processing unit 219 performs learning which meets preference of the user with use of a machine learning algorithm. The neural network is a network used to predict an output value from an input value, and, by previously learning an achieved value of the input value and an achieved value of the output value, is able to estimate an output value relative to a new input value. By using the neural network, the learning processing unit 219 performs learning which meets preference of the user with respect to the above-mentioned automatic image capturing, automatic editing, and subject search. Moreover, the learning processing unit 219 also performs operations to change, by learning, registration of subject information (a result of, for example, face recognition or general object recognition) which also serves as feature data to be input to the neural network, image capturing notification control, low power consumption mode control, and file automatic deletion.

Operations to which learning processing is applied in the present exemplary embodiment include the following operations:
(1) automatic image capturing;
(2) automatic editing;
(3) subject search;
(4) subject registration;
(5) image capturing notification control;
(6) low power consumption mode control;
(7) file automatic deletion;
(8) image shake correction; and
(9) image automatic transfer.

Furthermore, among the above-mentioned operations to which learning processing is applied, automatic editing, file automatic deletion, and image automatic transfer are not directly relevant to the gist of the present disclosure and the description thereof is, therefore, omitted.

<Automatic Image Capturing>

Learning about automatic image capturing is described. In automatic image capturing, learning for automatically performing image capturing of an image which meets preference of the user is performed. As described with reference to the flowchart of FIG. 9, after image capturing (after step S910), learning information generation processing (step S912) is performed. An image to be learned is caused to be selected by a method described below, and learning is performed by changing weights of the neural network based on learning information included in the image.

Learning is performed by changing of a neural network which performs determination of automatic image capturing timing and changing of a neural network which performs determination of an image capturing method (for example, still image capturing, moving image capturing, continuous shooting, and panorama image capturing). More specifically, whether to perform an image capturing operation is determined by a neural network, and learning is performed by changing weights of the neural network based on learning information included in image data to be learned. Moreover, the image capturing method is determined by a neural network, and learning is performed by changing weights of the neural network based on learning information included in image data to be learned.

<Subject Search>

Learning about subject search is described. In subject search, learning for automatically performing search for a subject which meets preference of the user is performed. As described with reference to the flowchart of FIG. 9, in subject search processing (step S904), an importance level for each area is calculated, pan, tilt, and zoom are driven, and subject search is performed. Learning is performed based on a captured image and detection information obtained during search, and is then reflected as a learning result by changing weights of the neural network. Subject search in which learning is reflected is performed by inputting various pieces of detection information obtained during a search operation to the neural network and determining an importance level. Moreover, in addition to calculation of the importance level, for example, control of a pan and tilt search method (speed and movement frequency) is also performed.

<Subject Registration>

Learning about subject registration is described. In subject registration, learning for automatically performing registration or ranking of a subject which meets preference of the user is performed. As learning to be performed, for example, face authentication registration, registration in general object recognition, gesture or voice recognition, and registration in scene recognition using a sound are performed. Authentication registration for persons and objects is performed, and setting for ranking is performed based on the number of times or the frequency at which images are acquired, the number of times or the frequency at which manual image capturing is performed, or the frequency at which a subject which is being searched for appears. The registered information is set to be registered as an input used for performing a determination using each neural network.

<Image Capturing Notification Control>

Learning about image capturing notification is described. As described in step S910 illustrated in FIG. 9, when a predetermined condition is satisfied immediately before image capturing, image capturing is performed after the camera informs a person targeted for image capturing of starting image capturing of the person. For example, driving of pan and tilt is used to visually guide the line of sight of a subject, a speaker sound emitted from the audio output unit 218 or light emitted from an LED by the LED control unit 224 is used to guide the attention of a subject. Immediately after the above-mentioned notification, based on whether detection information about a subject (for example, the degree of smile, detection of a line of sight, and gesture) has been obtained, whether to use the detection information for learning is determined, and learning is performed by changing weights of the neural network.

Various pieces of detection information obtained immediately before image capturing are input to the neural network, a determination as to whether to perform notification and a determination of various operations (sound (sound level, the type of sound, and timing), light (lighting time and speed), direction of the camera (pan and tilt motions)) are performed.

<Low Power Consumption Mode Control>

While, as described with reference to FIG. 7 and FIG. 8, supply of electric power to the main CPU (first control unit 223) is controlled to be turned on and off, learning of a return condition from the lower power consumption mode and a transition condition to the low power consumption state is also performed. Learning of a condition for cancelling the lower power consumption mode is described.

<Sound Detection>

Learning is able to be performed by the user manually setting a specific voice, a specific sound scene intended to be detected, or specific sound level via, for example, a communication using a dedicated application of the external apparatus 301. Moreover, a plurality of detection methods is previously set in the audio processing unit 214, and an image to be learned is caused to be selected by a method described below. Then, information about preceding and subsequent sounds included in an image is learned, and learning is able to be performed by setting sound determination serving as a start-up factor (a specific voice command or a sound scene of, for example, "cheer" or "clapping").

<Environmental Information Detection>

Learning is able to be performed by the user manually setting an environmental information change intended to serve as a start-up condition via, for example, communication using a dedicated application of the external apparatus 301. For example, start-up is able to be performed by a specific condition such as the absolute value or change amount of temperature, atmospheric pressure, brightness, humidity, or the amount of ultraviolet light. A determination threshold value that is based on each piece of environmental information is also able to be learned. If it is determined from camera detection information obtained after start-up caused by environmental information that the environmental information change has not been a start-up factor, parameters for respective determination threshold values are set in such a way as to be unlikely to detect an environmental information change.

Moreover, the above-mentioned respective parameters also change depending on the remaining charge amount of a battery. For example, when the remaining battery amount is small, the parameters are set to be unlikely to lead to various determinations, and, when the remaining battery amount is large, the parameters are set to be likely to lead to various determinations. Specifically, in a case where the remaining battery amount is large, even a shake state detection result or a sound scene detection result which is not a factor via which the user wants to start up the camera may lead to a determination to start up the camera.

Moreover, the determination for a low power consumption mode cancel condition is able to be performed based on a neural network from, for example, information about shake detection, sound detection, or time elapse detection, respective pieces of environmental information, or the remaining battery amount. In that case, an image to be learned is caused to be selected by a method described below, and learning is performed by changing weights of the neural network based on learning information included in the image.

Next, learning of a transition condition to the low power consumption state is described. As described with reference to FIG. 7, if, in the mode setting determination in step S704, it is determined that the operation mode is none of "automatic image capturing mode", "automatic editing mode", "image automatic transfer mode", "learning mode", and "file automatic deletion mode", the operation mode comes into the low power consumption mode. While the determination condition for each mode is as described above, a condition for determining each mode is also changed by learning.

<Automatic Image Capturing Mode>

While, as mentioned above, the importance level for each area is determined and automatic image capturing is performed while subject search is being performed by pan and tilt, if it is determined that there is no subject to be image-captured, the automatic image capturing mode is cancelled. For example, when the importance level of each of all of the areas or a value obtained by adding together importance levels of the respective areas has become less than or equal to a predetermined threshold value, the automatic image capturing mode is cancelled. At this time, gradually decreasing the predetermined threshold value according to an elapsed time from the time of transition to the automatic image capturing mode is also performed. As the elapsed time from the time of transition to the automatic image capturing mode becomes longer, the automatic image capturing mode becomes more likely to transition to the low power consumption mode.

Moreover, changing the predetermined threshold value depending on the remaining charge amount of a battery enables performing low power consumption mode control in consideration of battery capacity. For example, when the remaining battery amount is small, the threshold value is increased to cause the operation mode to be likely to transition to the low power consumption mode, and, when the remaining battery amount is large, the threshold value is decreased to cause the operation mode to be unlikely to transition to the low power consumption mode. Here, depending on an elapsed time and the number of captured images obtained after the last transition to the automatic image capturing mode, a parameter (an elapsed time threshold value TimeC) for the next low power consumption mode cancel condition is set to the second control unit 211 (sub CPU). The above-mentioned respective threshold values are changed by learning. Learning is performed by manually setting, for example, an image capturing frequency or a start-up frequency via, for example, a communication using a dedicated application of the external apparatus 301.

Moreover, a configuration in which an average value of elapsed times from the time of turning on of the power button of the camera 101 to the time of turning off of the power button or distribution data about the elapsed times for each time range is accumulated and the respective parameters are learned can be employed. In that case, learning is performed in such a manner that, with respect to a user with the time from turning on of the power source to turning off thereof short, a time interval for a return from the low power consumption mode or a transition to the low power consumption state becomes short and, with respect to a user with the time from turning on of the power source to turning off thereof long, the time interval becomes long.

Moreover, learning is also performed by detection information obtained in the process of search. Learning is performed in such a manner that, during a period when it is determined that there are a large number of subjects set by learning as important, a time interval for a return from the low power consumption mode or a transition to the low power consumption state becomes short and, during a period when it is determined that there are a small number of subjects set by learning as important, the time interval becomes long.

<Image Shake Correction>

Learning about image shake correction is described. Image shake correction is performed by calculating the correction amount in step S902 illustrated in FIG. 9 and then driving pan and tilt based on the calculated correction amount in step S905. In image shake correction, learning is performed to perform a correction meeting features of a shake occurring with respect to the user. The direction and magnitude of a shake are able to be estimated by applying, for example, the point spread function (PSF) to a captured image. In the learning information generation in step S912 illustrated in FIG. 9, the estimated direction and magnitude of a shake are appended as information to the image.

Within the learning mode processing in step S716 illustrated in FIG. 7, weights of a neural network for image shake correction are learned. At this time, the estimated direction and magnitude of a shake are treated as an output. Moreover, respective pieces of detection information obtained during image capturing (motion vector information obtained a predetermined time before image capturing, motion information about a subject (person or object), and vibration information (a gyroscope output, an acceleration output, and a camera state)) are treated as an input. Besides, for example, environmental information (temperature, atmospheric pressure, illuminance, and humidity), sound information (sound scene determination, specific voice detection, and sound level change), time information (an elapsed time from the time of start-up and an elapsed time from the time of previous image capturing), and place information (GPS location information and place movement change amount) can be added to an input to be used for determination.

At the time of calculation of the image shake correction amount in step S902, inputting the above-mentioned respective pieces of detection information to the neural network enables estimating the magnitude of a shake occurring during image capturing performed at that moment. Then, when the estimated magnitude of the shake is large, such control as to increase a shutter speed becomes able to be performed. Moreover, since, when the estimated magnitude of the shake is large, a blurred image may be captured, such a method as to inhibit image capturing can also be employed.

Moreover, while, since there is a limit to pan and tilt driving angles, when the driving end is reached, any further correction is not able to be performed, estimating the direction and magnitude of a shake occurring during image capturing enables estimating a range required for pan and tilt driving to correct an image shake occurring during an exposure. In a case where there is no room for a movable range during an exposure, setting the driving range so as not to exceed the movable range, by increasing the cutoff frequency of a filter for calculating an image shake correction amount, also enables preventing or reducing a large image shake. Moreover, in a case where the driving range is likely to exceed the movable range, starting an exposure after rotating the pan or tilt angle in a direction opposite to the direction in which the driving range is likely to exceed the movable range immediately before the exposure also enables performing image capturing with no image shake while securing the movable range. This enables learning image shake correction in conformity with features or usage for image capturing of the user, thus preventing a captured image from blurring.

Moreover, in the above-described <Determination of image capturing method>, whether to perform follow shot image capturing, which is image capturing in which, while a moving subject has no shake, an unmoving background flows, can also be determined. In that case, subject shake correction can be performed by estimating a pan and tilt driving speed required to perform image capturing without a subject having any shake from detection information obtained before the image capturing. At this time, inputting the above-mentioned respective pieces of detection information to a neural network which has already performed learning enables estimating the driving speed. Learning is performed based on information about the direction and magnitude of a shake in a block in which a main subject is situated, which is estimated by segmenting an image into blocks and estimating the point spread function (PSF) of each block.

Moreover, the background flow amount is able to be learned from information about images selected by the user. In that case, the magnitude of a shake in a block in which a main subject is not situated is estimated, and a preference of the user can be learned based on information about the estimated magnitude. Setting a shutter speed for image capturing based on the background flow amount corresponding to the learned preference enables automatically performing image capturing capable of attaining a follow shot effect meeting the preference of the user.

Next, a learning method is described. The learning method includes "intra-camera learning" and "learning using cooperation with an external apparatus".

Methods of intra-camera learning are described in the following description. The intra-camera learning in the present exemplary embodiment includes the following methods:

(1) learning using detection information obtained during manual image capturing; and (2) learning using detection information obtained during subject search.

<Learning Using Detection Information Obtained During Manual Image Capturing>

As described in step S907 to step S913 illustrated in FIG. 9, in the present exemplary embodiment, the camera 101 is able to perform two image capturing operations, i.e., manual image capturing and automatic image capturing. In a case where a manual image capturing instruction has been received in step S907, then in step S912, information indicating that a captured image is an image which has been manually captured is appended to the captured image. Moreover, in a case where image capturing has been performed in response to turning-on of automatic image capturing having been determined in step S909, then in step S912, information indicating that a captured image is an image which has been automatically captured is appended to the captured image.

Here, in the case of a manually captured image, the captured image has a very high probability of having been captured based on the user's favorite subject, favorite scene, favorite place, or favorite time interval. Therefore, learning is configured to be performed based on learning information about respective pieces of feature data or a captured image obtained during manual image capturing. Moreover, learning is performed from detection information obtained during manual image capturing with respect to extraction of a feature amount in a captured image, registration in personal authentication, registration of the expression on an individual's face, or registration of a combination of persons. Moreover, learning is performed from detection information obtained during subject search in such a way as to change the degree of importance of a nearby person or object based on an expression on the face of a subject personally registered.

<Learning Using Detection Information Obtained During Subject Search>

During a subject search operation, concurrently with what person, object, or scene a subject registered in personal authentication is shown in an image is determined, and a time ratio at which both the subject and the person, object, or scene are concurrently shown within the angle of view is calculated. For example, a time ratio at which a person A serving as a personal authentication registered subject and a person B serving as a personal authentication registered subject are concurrently shown in an image is calculated. Then, in a case where the person A and the person B enter the angle of view, various pieces of detection information are stored as learning data in such a manner that a score for automatic image capturing determination becomes high and are then learned in the learning mode processing (step S716).

For another example, a time ratio at which a person A serving as a personal authentication registered subject is shown in an image concurrently with a subject "cat" determined by general object recognition is calculated. Then, in a case where the person A and the subject "cat" enter the angle of view, various pieces of detection information are stored as learning data in such a manner that a score for automatic image capturing determination becomes high and are then learned in the learning mode processing (step S716).

Moreover, in a case where a high degree of smile of the person A serving as a personal authentication registered subject has been detected or in a case where the expression such as "delight" or "surprise" on the face of the person A has been detected, learning is performed meaning that a subject shown in an image concurrently with the person A is important. Alternatively, in a case where the expression such as "anger" or "serious look" on the face of the person A has been detected, since a subject shown in an image concurrently with the person A is low in the probability of being important, processing is performed, for example, in such a way as not to perform learning.

Next, learning using cooperation with an external apparatus in the present exemplary embodiment is described. The learning using cooperation with an external apparatus in the present exemplary embodiment includes the following methods:

(1) learning using an image being acquired by an external apparatus;
(2) learning using a determination value being input to an image via an external apparatus;
(3) learning using an image stored in an external apparatus being analyzed;
(4) learning using information uploaded by an external apparatus to a social networking service (SNS) server;
(5) learning using camera parameters being changed by an external apparatus; and
(6) learning using information obtained by manually editing an image in an external apparatus.

<Learning Using an Image being Acquired by an External Apparatus>

As described with reference to FIG. 3, the camera 101 and the external apparatus 301 include respective communication units which perform the first communication 302 and the second communication 303. Then, transmission and reception of images are performed mainly via the first communication 302, so that an image stored in the camera 101 is able to be transmitted to the external apparatus 301 via a dedicated application included in the external apparatus 301. Moreover, thumbnail images of image data stored in the camera 101 are able to be viewed via a dedicated application included in the external apparatus 301. The user can select an image which the user likes from among the thumbnail images, perform image confirmation, and operate an image acquisition instruction to transmit the image to the external apparatus 301.

At this time, since the user selects an image to be acquired, the acquired image has a very high probability of being an image which the user likes. Therefore, the acquired image is determined to be an image to be learned and learning is performed based on learning information about the acquired image, so that various learning operations for favorites of the user can be performed.

Figure 12:
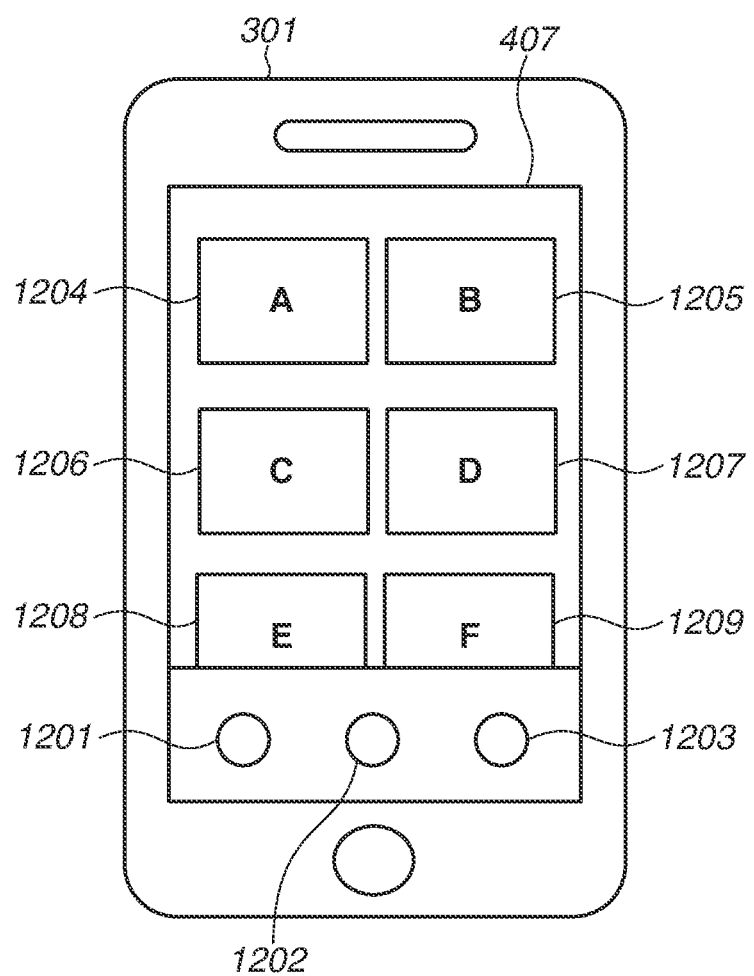
FIG. 12 is a diagram illustrating a manner in which images are viewed on the external apparatus.

Here, an operation example is described. FIG. 12 illustrates an example in which images stored in the camera 101 are made viewable via a dedicated application included in the external apparatus 301. Thumbnail images (1204 to 1209) of image data stored in the camera 101 are displayed on the display unit 407, and the user is allowed to select and acquire an image which the user likes. In this respect, buttons 1201, 1202, and 1203, which constitute a display method changing unit for changing a display method, are provided.

When the button 1201 is pressed, the display method is changed to a date and time priority display mode, so that images are displayed on the display unit 407 in the order of image capturing date and time of images stored in the camera 101. For example, an image newer in date and time is displayed in a field 1204, and an image older in data and time is displayed in a field 1209.

When the button 1202 is pressed, the display method is changed to a recommended image priority mode. Images stored in the camera 101 are displayed on the display unit 407, based on scores calculated in step S912 illustrated in FIG. 9 by determining the preference of the user with respect to the images, in descending order of score. For example, an image having a higher score is displayed in the field 1204, and an image having a lower score is displayed in the field 1209.

When the button 1203 is pressed, the user is allowed to designate a person or object subject, and, when the user designates a specific person or object subject, only the specific subject is displayed. The buttons 1201 to 1203 are also able to be concurrently set to an on-state. For example, in a case where all of the buttons 1201 to 1203 are set to an on-state, only the designated subject is displayed, and an image newer in image capturing date and time is prioritized to be displayed and an image having a higher score is prioritized to be displayed. In this way, since the preference of the user is also learned with respect to captured images, only the user's favorite images can be extracted from a large number of captured images.

<Learning Using a Determination Value being Input to an Image Via an External Apparatus>

As described in the above description, the camera 101 and the external apparatus 301 include respective communication units, and thumbnail images stored in the camera 101 are able to be viewed via a dedicated application included in the external apparatus 301. Here, a configuration in which the user is allowed to give a score to each image can be employed. The user can give a high score (for example, 5 points) to an image which the user likes, and can give a low score (for example, 1 point) to an image which the user does not like, so that the camera 101 is configured to perform learning according to the user's operation. The score given to each image is used for relearning together with learning information within the camera 101. Learning is performed in such a manner that the output of a neural network with feature data from the designated image information used as an input thereof comes close to the score designated by the user.

While, in the present exemplary embodiment, a configuration in which the user inputs a determination value to a captured image via the external apparatus 301 is employed, a configuration in which the user operates the camera 101 to directly input a determination value to an image can be employed. In that case, for example, the camera 101 is provided with a touch panel display, and the user presses a graphical user interface (GUI) button displayed on a screen display portion of the touch panel display to set the operation mode to a mode for displaying captured images. Then, while checking the captured images, the user inputs a determination value to each of the captured images, so that similar learning can be performed in such a method.

<Learning Using an Image Stored in an External Apparatus being Analyzed>

The external apparatus 301 includes the storage unit 404 and is configured to also record, on the storage unit 404, images other than images captured by the camera 101. At this time, images stored in the external apparatus 301 are easy for the user to view and are easy to upload to a shared server via the public wireless control unit 406, and, therefore, have a very high possibility of including a large number of user's favorite images.

The control unit 411 of the external apparatus 301 is configured to be able to process an image stored in the storage unit 404 via a dedicated application at an ability equivalent to that of the learning processing unit 219 included in the camera 101. Then, the control unit 411 communicates the processed learning data to the camera 101, thus enabling learning. Alternatively, the control unit 411 can be configured to transmit an image or data intended to be learned to the camera 101, thus enabling learning in the camera 101. Moreover, the control unit 411 can be configured to allow the user to select an image intended to be learned from among images stored in the storage unit 404, thus enabling learning.

<Learning Using Information Uploaded by an External Apparatus to an SNS Server>

Next, a method of using, for learning, information included in a social networking system (SNS), which is a service or website capable of building social networks focusing on a connection between individuals, is described. There is a technique in which, when an image is uploaded to an SNS, a tag concerning the image is input from the external apparatus 301 and the input tag is transmitted together with the image. Moreover, there is also a technique in which the use is allowed to input likes and dislikes with respect to an image uploaded by another user, and it is also possible to determine whether an image uploaded by another user is a photograph which the user owning the external apparatus 301 favors.

A dedicated SNS application downloaded int the external apparatus 301 is able to be used to acquire an image which the user has directly uploaded in the above-mentioned manner and information about the image. Moreover, in response to the user inputting likes or dislikes with respect to images which other users have uploaded, the user's favorite images and tag information thereabout are able to be acquired. These images and tag information thereabout are analyzed to become able to be learned in the camera 101.

The control unit 411 of the external apparatus 301 is configured to acquire images which the user has uploaded and images which the user has determined as the user's favorite images as mentioned above and to be able to process the images at an ability equivalent to that of the learning processing unit 219 included in the camera 101. Then, the control unit 411 communicates the processed learning data to the camera 101, thus enabling learning. Alternatively, the control unit 411 can be configured to transmit an image or data intended to be learned to the camera 101, thus enabling learning in the camera 101.

Moreover, subject information which the user seems to like is estimated from subject information set in the tag information (for example, subject object information such as a dog or cat, scene information such as a beach, or facial expression information such as a smile). Then, learning is performed by registering the estimated subject information as a subject to be detected which is input to a neural network.

Moreover, a configuration in which image information currently fashionable in the world is estimated from statistical values of tag information (image filter information or subject information) in the above-mentioned SNS and the estimated image information is learned in the camera 101 can be employed.

<Learning Using Camera Parameters being Changed by an External Apparatus>

As mentioned in the above description, the camera 101 and the external apparatus 301 include respective communication units. Then, learning parameters (for example, weights of a neural network and selection of subjects to be input to the neural network) currently set in the camera 101 are able to be communicated to the external apparatus 301 and then be stored in the storage unit 404 of the external apparatus 301. Moreover, learning parameters set in a dedicated server are able to be acquired via the public wireless control unit 406 with use of a dedicated application included in the external apparatus 301 and then be set to learning parameters stored in the camera 101. With this configuration, when a parameter obtained at a certain point is stored in the external apparatus 301 in advance and is then set to the camera 101, a learning parameter is able to be returned. Moreover, a learning parameter retained by another user is also able to be acquired via a dedicated server and then be set to the camera 101 of the user.

Moreover, a voice command registered by the user, authentication registration, and gestures can be configured to be able to be registered via a dedicated application of the external apparatus 301, and an important place can be registered. These pieces of information are treated as an image capturing trigger or input data for automatic image capturing determination described in the automatic image capturing mode processing (FIG. 9). Moreover, a configuration in which, for example, an image capturing frequency, a start-up interval, a ratio between still images and moving images, and user's favorite images are able to be set can be employed, so that setting of, for example, a start-up interval described in <Low power consumption mode control> can be performed.

<Learning Using Information Obtained by Manually Editing an Image in an External Apparatus>

A dedicated application of the external apparatus 301 can be configured to be provided with a function of manually performing an editing operation by the operation of the user, and the contents of the editing operation can be fed back to learning. For example, editing of image effect applications (cropping processing, rotation processing, slide, zoom, fade, color conversion filter effect, time, ratio between still images and moving images, and background music (BGM)) is able to be performed. Then, a neural network for automatic editing is caused to perform learning in such a manner that image effect applications manually edited are determined with respect to learning information about images.

Next, a learning processing sequence is described. In the mode setting determination in step S704 illustrated in FIG. 7, the first control unit 223 determines whether to ought to perform learning processing, and, if it is determined to ought to perform learning processing, the first control unit 223 performs learning mode processing in step S716.

Figure 13:
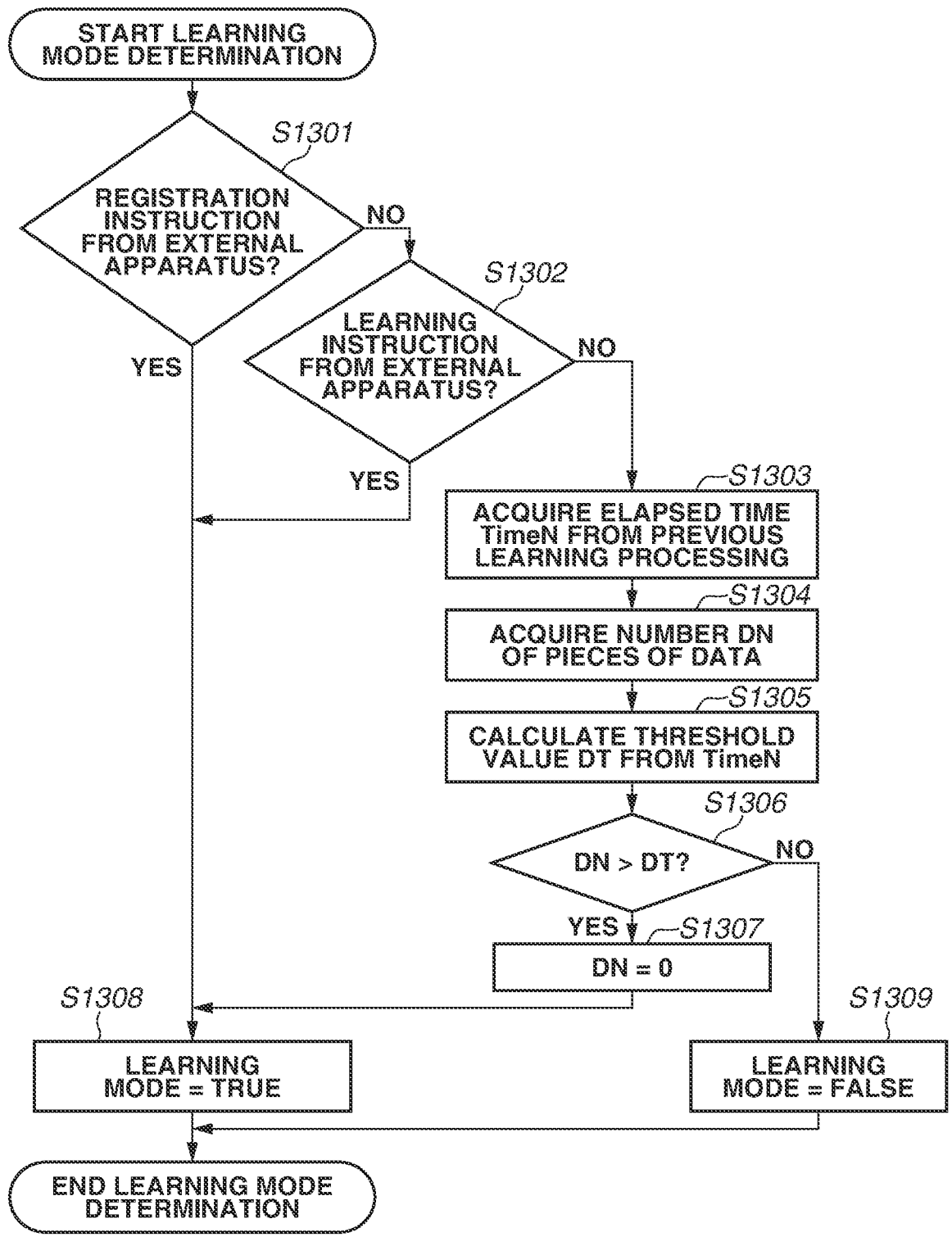
FIG. 13 is a flowchart illustrating learning mode determination.

A determination condition for the learning mode is described. Whether to transition to the learning mode is determined from, for example, an elapsed time from the previous learning processing being performed, the number of pieces of information usable for learning, or whether a learning processing instruction has been received via the external apparatus 301. FIG. 13 illustrates a flow of processing for determining whether to ought to transition to the learning mode, which is performed in the mode setting determination processing in step S704.

When an instruction for starting the learning mode determination is issued in the mode setting determination processing in step S704, the first control unit 223 starts the processing illustrated in FIG. 13. In step S1301, the first control unit 223 determines whether a registration instruction from the external apparatus 301 has been received. Here, the first control unit 223 determines whether a registration instruction for performing learning has been received. Specifically, the first control unit 223 determines whether a registration instruction for performing learning such as the above-mentioned <Learning using an image being acquired by an external apparatus>, <Learning using a determination value being input to an image via an external apparatus>, or <Learning using an image stored in an external apparatus being analyzed> has been received.

If, in step S1301, it is determined that a registration instruction from the external apparatus 301 has been received (YES in step S1301), the first control unit 223 advances the processing to step S1308, in which the first control unit 223 sets the learning mode determination to TRUE, thus performing setting to perform the processing in step S716, and then ends the learning mode determination processing. If it is determined that no registration instruction from the external apparatus 301 has been received (NO in step S1301), the first control unit 223 advances the processing to step S1302.

In step S1302, the first control unit 223 determines whether a learning instruction from the external apparatus 301 has been received. Here, the first control unit 223 determines whether an instruction for setting learning parameters, such as <Learning using camera parameters being changed by an external apparatus>, has been received. If, in step S1302, it is determined that a learning instruction from the external apparatus 301 has been received (YES in step S1302), the first control unit 223 advances the processing to step S1308, in which the first control unit 223 sets the learning mode determination to TRUE, thus performing setting to perform the processing in step S716, and then ends the learning mode determination processing. If it is determined that no learning instruction from the external apparatus 301 has been received (NO in step S302), the first control unit 223 advances the processing to step S1303.

In step S1303, the first control unit 223 acquires an elapsed time TimeN from the previous learning processing (recalculation of weights of a neural network) being performed, and then advances the processing to step S1304. In step S1304, the first control unit 223 acquires the number DN of pieces of new data to be learned (the number of images designated to be learned during the elapsed time TimeN from the previous learning processing having been performed), and then advances the processing to step S1305. In step S1305, the first control unit 223 calculates a threshold value DT used for determining whether to come into the learning mode from the elapsed time TimeN. Setting is performed in such a manner that, as the value of the threshold value DT is smaller, the first control unit 223 is likely to come into the learning mode. For example, a value DTa of the threshold value DT in a case where the elapsed time TimeN is smaller than a predetermined value is set larger than a value DTb of the threshold value DT in a case where the elapsed time TimeN is larger than the predetermined value, so that the threshold value is set in such a way as to become smaller with the passage of time. With this setting, even in a case where the number of pieces of learning data is small, if the elapsed time is large, the first control unit 223 becomes likely to come into the learning mode and perform learning again, so that the camera is likely to change in learning according to the operating time thereof.

Upon completion of calculation of the threshold value DT in step S1305, the control unit 223 advances the processing to step S1306, in which the first control unit 223 determines whether the number DN of pieces of data to be learned is greater than the threshold value DT. If it is determined that the number DN of pieces of data is greater than the threshold value DT (YES in step S1306), the first control unit 223 advances the processing to step S1307, in which the first control unit 223 sets the number DN of pieces of data to 0. Then, the first control unit 223 advances the processing to step S1308, in which the first control unit 223 sets the learning mode determination to TRUE, thus performing setting to perform the processing in step S716 (FIG. 7), and then ends the learning mode determination processing.

If, in step S1306, it is determined that the number DN of pieces of data is less than or equal to the threshold value DT (NO in step S1306), the first control unit 223 advances the processing to step S1309. Since neither a registration instruction from the external apparatus 301 nor a learning instruction from the external apparatus 301 has been received and the number of pieces of learning data is less than or equal to a threshold value, the first control unit 223 sets the learning mode determination to FALSE, thus performing setting not to perform the processing in step S716, and then ends the learning mode determination processing.

Figure 14:
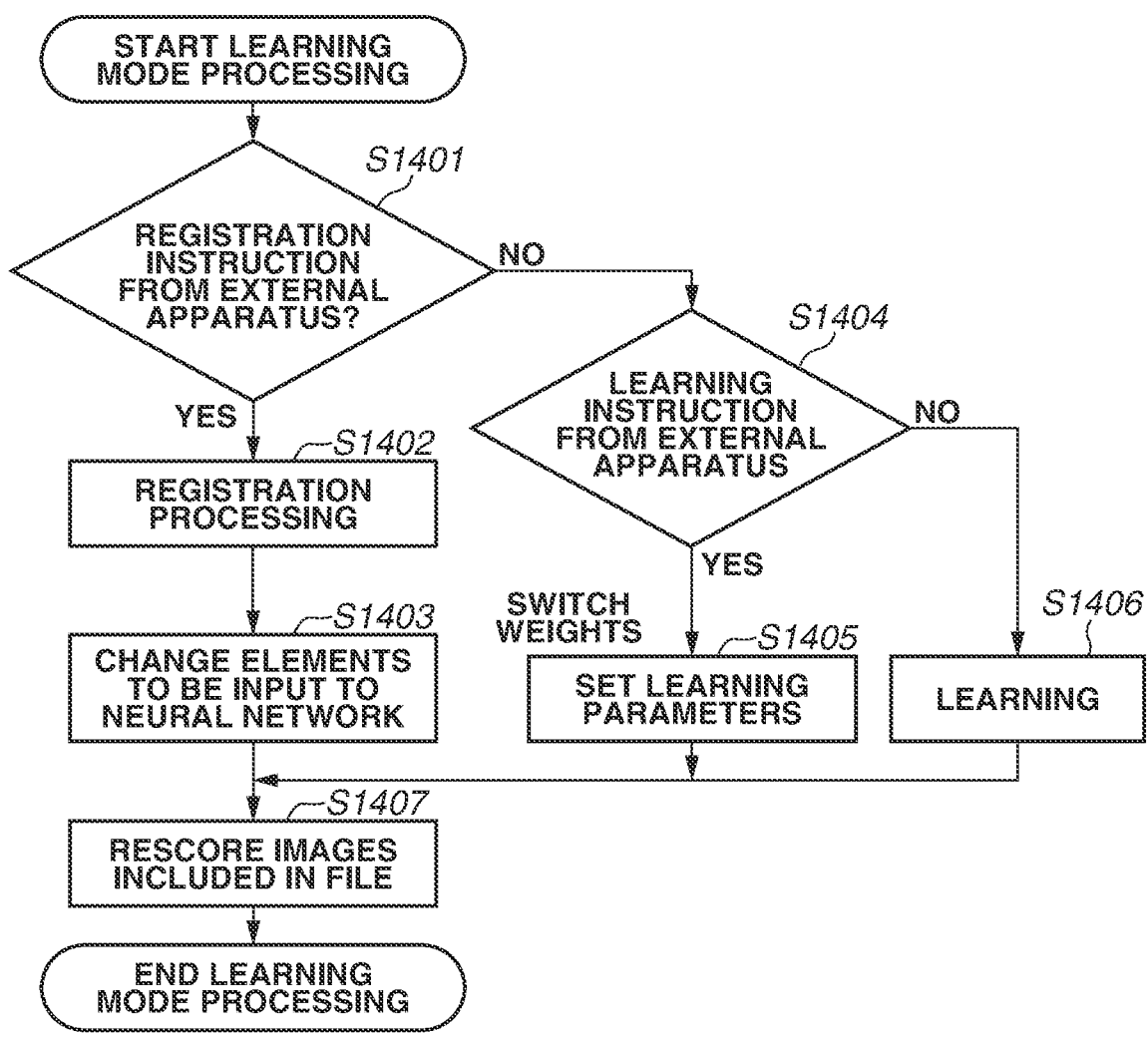
FIG. 14 is a flowchart illustrating learning mode processing.

Next, processing which is performed in the learning mode processing (step S716) is described. FIG. 14 is a flowchart illustrating details of an operation in the learning mode processing.

If, in step S715 illustrated in FIG. 7, it is determined that the mode setting is the learning mode, the first control unit 223 advances the processing to step S716, thus starting the processing illustrated in FIG. 14. In step S1401, the first control unit 223 determines whether a registration instruction from the external apparatus 301 has been received. If, in step S1401, it is determined that a registration instruction from the external apparatus 301 has been received (YES in step S1401), the first control unit 223 advances the processing to step S1402. In step S1402, the first control unit 223 performs various registration processing operations.

The various registration processing operations are operations for registration of features to be input to a neural network, and are, for example, operations for registration of face authentication, registration of general object recognition, registration of sound information, and registration of place information. Upon completion of registration processing, the first control unit 223 advances the processing to step S1403, in which the first control unit 223 changes elements to be input to a neural network from the information registered in step S1402. Upon completion of processing in step S1403, the first control unit 223 advances the processing to step S1407.

If, in step S1401, it is determined that no registration instruction from the external apparatus 301 has been received (NO in step S1401), the first control unit 223 advances the processing to step S1404, in which the first control unit 223 determines whether a learning instruction from the external apparatus 301 has been received. If it is determined that a learning instruction from the external apparatus 301 has been received (YES in step S1404), the first control unit 223 advances the processing to step S1405, in which the first control unit 223 sets the learning parameters communicated from the external apparatus 301 to respective determiners (for example, weights of a neural network), and then advances the processing to step S1407.

If, in step S1404, it is determined that no learning instruction from the external apparatus 301 has been received (NO in step S1404), then in step S1406, the first control unit 223 performs learning (recalculation of weights of the neural network). Processing in step S1406 is performed, as explained with reference to FIG. 13, in a case where the number DN of pieces of data to be learned exceeds the threshold value DT and, thus, relearning for the respective determines is performed. The first control unit 223 performs relearning using a method such as a backpropagation method or a gradient descent method, recalculates weights of the neural network, and changes parameters of the respective determiners. Upon completion of setting of the learning parameters, the first control unit 223 advances the processing to step S1407.

In step S1407, the first control unit 223 rescores images included in a file. In the present exemplary embodiment, the first control unit 223 is configured to score all of the captured images stored in a file (recording medium 221) based on the learning result and then perform automatic editing or automatic file deletion according to the given scores. Therefore, in a case where relearning or setting of learning parameters from an external apparatus has been performed, it is necessary to also perform updating of the score of a captured image. Therefore, in step S1407, the first control unit 223 performs recalculation for giving a new score to a captured image stored in the file, and, upon completion of scoring processing, ends the learning mode processing.

While, in the present exemplary embodiment, a method of extracting a scene which the user seems to like, learning features of the scene, and reflecting the learned features in a camera operation such as automatic image capturing or automatic editing, thus suggesting a user's favorite video image, has been described, the present disclosure is not limited to this use application. For example, the present disclosure can also be used for a use application for daring to suggest a video image different from the preference of the user. Examples of implementation methods for such use application are as follows.

<Method Using a Neural Network Caused to Learn Preference>

With regard to learning, the first control unit 223 learns the preference of the user according to a method described in the above description. Then, the first control unit 223 performs automatic image capturing when, in step S908 for <Automatic image capturing>, the output value of a neural network is a value indicating that such output value is different from the preference of the user serving as teacher data. For example, in a case where an image which the user has liked is set as a teacher image and learning is performed in such a manner that a high value is output when the output value indicates features having a resemblance to the teacher image, the first control unit 223 performs automatic image capturing, conversely, under and subject to the output value being lower than a predetermined value. Moreover, similarly, even in subject search processing or automatic editing processing, the first control unit 223 performs such processing that the output value of a neural network becomes a value indicating that the output value is different from the preference of the user serving as teacher data.

<Method Using a Neural Network Caused to Learn a Situation Different from Preference>

In this method, the first control unit 223 performs learning using a situation different from the preference of the user as teacher data. For example, in the above description, a learning method in which an image captured manually is assumed to be a scene which the user has captured by preference and is thus set as teacher data has been described. However, here, conversely, an image captured manually is not used as teacher data and a scene for which manual image capturing has not been performed a predetermined time or more is added as teacher data. Alternatively, if a scene similar in features to an image captured manually is included in teacher data, such a scene can be deleted from the teacher data. Moreover, an image different in features from an image acquired by an external apparatus can be added to teacher data, or an image similar in features to the acquired image can be deleted from teacher data. With this configuration, pieces of data different from the preference of the user gather together in teacher data, so that, as a result of learning, the neural network becomes able to discriminate a situation different from the preference of the user. Then, since, in automatic image capturing, image capturing is performed according to the output value of the neural network, a scene different from the preference of the user is able to be captured.

As mentioned above, if a video image different from the preference of the user is daringly suggested, a scene for which the user would not manually perform image capturing is captured, so that a failure to perform image capturing can be reduced. Moreover, since image capturing for a scene different from the mindset of the user is suggested, advantageous effects of creating awareness to the user or widening the range of preference can be expected.

Moreover, when the above-mentioned methods are combined, a situation which somewhat resembles the preference of the user but differs in part therefrom can also be suggested, and the degree of conformance to the preference of the user is easy to adjust. The degree of conformance to the preference of the user can be changed according to the mode setting, the states of various sensors, or the state of detection information.

In the present exemplary embodiment, a configuration in which learning is performed in the camera 101 has been described. However, even in a configuration in which the external apparatus 301 has a learning function, data required for learning is communicated to the external apparatus 301, and learning is performed only in the external apparatus 301, similar learning effects can be implemented. In that case, as described above in <Learning using camera parameters being changed by an external apparatus>, a configuration in which learning is performed by setting, to the camera 101 via communication, parameters such as weights of a neural network learned by the external apparatus 301 can be employed.

Moreover, a configuration in which both the camera 101 and the external apparatus 301 have respective learning functions can be employed. In this case, for example, a configuration in which learning is performed by communicating learning information retained by the external apparatus 301 to the camera 101 at timing when the learning mode processing (step S716) is performed in the camera 101 and then merging learning parameters can be employed.

According to the above-described exemplary embodiment, as compared with background art, in an image capturing apparatus which performs automatic image capturing, an image capturing frequency is able to be controlled. Therefore, it becomes possible to prevent or reduce a failure to capture a video image as much as possible.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-180365 filed Sep. 30, 2019, which is hereby incorporated by reference herein in its entirety.

What is claimed is:

1. An image capturing apparatus comprising:
an image pickup device configured to output image data; and
at least one processor programmed to perform the operations of following units:
a calculation unit configured to calculate an evaluation value used to determine whether to perform an image capturing operation for recording the image data;
a setting unit configured to set a threshold value used to determine whether to perform an image capturing operation for recording the image data;
a determination unit configured to make a determination as to whether to control execution of an image capturing operation using the evaluation value and the threshold value; and
a storing unit configured to store image capturing history information obtained from execution of an image capturing operation based on the determination made by the determination unit,
wherein the setting unit sets the threshold value based on the image capturing history information, and
the image capturing history information stored by the storing unit includes at least an image capturing time and an evaluation value of an automatic image capturing.

2. The image capturing apparatus according to claim 1, further comprising a detection unit configured to detect information about a subject,
wherein the calculation unit sets the evaluation value using the information about a subject.

3. The image capturing apparatus according to claim 2, wherein the information about a subject is at least one of information about a sound and information that is based on image data captured by the image pickup device.

4. The image capturing apparatus according to claim 1, wherein an initial value of the threshold value is set based on a result of past learning.

5. The image capturing apparatus according to claim 1, wherein the setting unit makes a comparison between time at which the latest image capturing operation was performed stored by the storing unit and current time, and, if a difference obtained by the comparison is smaller than a predetermined value, the setting unit sets the threshold value higher than an initial value thereof.

6. The image capturing apparatus according to claim 1, wherein the setting unit sets the threshold value to an initial value thereof in a case where current time is within a predetermined time from time of the latest image capturing operation stored by the storing unit and a change of the evaluation value stored by the storing unit has an increasing tendency.

7. The image capturing apparatus according to claim 1, wherein the setting unit sets the threshold value in such a manner that the threshold value decreases as image capturing time passes.

8. The image capturing apparatus according to claim 7, wherein, when decreasing the threshold value as image capturing time passes, the setting unit sets the threshold value to an initial value thereof in a case where an image capturing operation has been performed based on the determination made by the determination unit in a state in which the threshold value has become lower than the initial value.

9. The image capturing apparatus according to claim 1, wherein, for a predetermined time after image capturing, the setting unit sets the threshold value higher than an initial value thereof.

10. The image capturing apparatus according to claim 1, wherein the setting unit sets the threshold value depending on still image capturing or moving image capturing.

11. The image capturing apparatus according to claim 1, wherein the setting unit includes a discrimination unit configured to discriminate a state of the image capturing apparatus, and sets the threshold value depending on discrimination performed by the discrimination unit.

12. The image capturing apparatus according to claim 1, wherein the determination unit determines whether to perform an image capturing operation by a neural network, and causes learning to be performed by changing weights of the neural network based on learning information included in image data to be learned.

13. The image capturing apparatus according to claim 1, wherein the determination unit determines an image capturing method by a neural network, and causes learning to be performed by changing weights of the neural network based on learning information included in image data to be learned.

14. A control method for an image capturing apparatus including an image pickup device configured to output image data, the control method comprising:
calculating an evaluation value used to determine whether to perform an image capturing operation for recording image data output by the image pickup device;
setting a threshold value used to determine whether to perform an image capturing operation for recording image data output by the image pickup device;
making a determination as to whether to perform an image capturing operation using the evaluation value and the threshold value; and
storing image capturing history information obtained from execution of an image capturing operation based on the determination,
wherein the threshold value is set based on the image capturing history information, and
the image capturing history information stored includes at least an image capturing time and an evaluation value of an automatic image capturing.

15. A non-transitory computer-readable storage medium storing computer-executable instructions that, when executed by a computer, cause the computer to perform a control method for an image capturing apparatus including an image pickup device configured to output image data, the control method comprising:
calculating an evaluation value used to determine whether to perform an image capturing operation for recording image data output by the image pickup device;
setting a threshold value used to determine whether to perform an image capturing operation for recording image data output by the image pickup device;
making a determination as to whether to perform an image capturing operation using the evaluation value and the threshold value; and
storing image capturing history information obtained from execution of an image capturing operation based on the determination,
wherein the threshold value is set based on the image capturing history information, and
the image capturing history information stored includes at least an image capturing time and an evaluation value of an automatic image capturing.

* * * * *